United States Patent
Wang et al.

(10) Patent No.: US 11,425,683 B2
(45) Date of Patent: Aug. 23, 2022

(54) INFORMATION TRANSMISSION METHOD AND NETWORK DEVICE

(71) Applicant: HUAWEI TECHNOLOGIES CO., LTD., Guangdong (CN)

(72) Inventors: Man Wang, Shanghai (CN); Haiyan Luo, Shanghai (CN); Mingzeng Dai, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 31 days.

(21) Appl. No.: 16/581,125

(22) Filed: Sep. 24, 2019

(65) Prior Publication Data

US 2020/0022109 A1 Jan. 16, 2020

Related U.S. Application Data

(63) Continuation of application No. PCT/CN2018/080385, filed on Mar. 24, 2018.

(30) Foreign Application Priority Data

Mar. 24, 2017 (CN) .......................... 201710183327.0
Sep. 29, 2017 (CN) .......................... 201710909222.9

(51) Int. Cl.
*H04W 68/02* (2009.01)
*H04W 76/28* (2018.01)
(Continued)

(52) U.S. Cl.
CPC ......... *H04W 68/02* (2013.01); *H04W 68/005* (2013.01); *H04W 76/27* (2018.02);
(Continued)

(58) Field of Classification Search
None
See application file for complete search history.

(56) References Cited

U.S. PATENT DOCUMENTS 9,648,583 B2 * 5/2017 Jin ...................... H04W 68/005
2007/0281715 A1 * 12/2007 Take ...................... H04W 68/00
455/458

(Continued)

FOREIGN PATENT DOCUMENTS

CN 101278592 A 10/2008
CN 106162730 A 11/2016
(Continued)

OTHER PUBLICATIONS

Office Action issued in Korean Application No. 2019-7030725 dated Aug. 27, 2020, 10 pages (with English translation).
(Continued)

*Primary Examiner* — Edan Orgad
*Assistant Examiner* — Emmanuel K Maglo
(74) *Attorney, Agent, or Firm* — Fish & Richardson P.C.

(57) ABSTRACT

The present disclosure relates to information transmission methods and network devices. One example method includes a second network node sends a first paging message to a first network node, where the first paging message comprises first configuration information corresponding to a terminal device, and the first configuration information comprises identification information of the terminal device and a paging cycle of the terminal device. The first network node determines paging occasion based on the first configuration information and configuration information of a cell served by the first network node. The first network node sends a third paging message based on the first paging message and the first paging configuration parameter, where the third paging message is used for paging the terminal device.

28 Claims, 6 Drawing Sheets

(51) Int. Cl.
　　　*H04W 76/27*　　　(2018.01)
　　　*H04W 68/00*　　　(2009.01)
　　　*H04W 80/02*　　　(2009.01)
　　　*H04W 80/08*　　　(2009.01)

(52) U.S. Cl.
　　　CPC .......... *H04W 76/28* (2018.02); *H04W 80/02* (2013.01); *H04W 80/08* (2013.01)

(56) References Cited

U.S. PATENT DOCUMENTS

| | | | |
|---|---|---|---|
| 2012/0057496 A1* | 3/2012 | Jin | H04W 68/00 370/252 |
| 2013/0109391 A1 | 5/2013 | Lee et al. | |
| 2013/0184013 A1* | 7/2013 | Chao | H04W 68/02 455/458 |
| 2015/0327155 A1 | 11/2015 | Lee et al. | |
| 2016/0081022 A1* | 3/2016 | Haneji | H04W 76/28 370/311 |
| 2016/0165573 A1* | 6/2016 | Jin | H04W 68/02 455/458 |
| 2017/0142560 A1* | 5/2017 | Ryu | H04W 4/90 |
| 2017/0142686 A1 | 5/2017 | Zhang | |
| 2018/0270713 A1* | 9/2018 | Park | H04L 5/0053 |
| 2018/0270791 A1* | 9/2018 | Park | H04W 76/27 |
| 2018/0270895 A1* | 9/2018 | Park | H04W 8/005 |
| 2019/0223160 A1* | 7/2019 | He | H04W 72/042 |
| 2019/0335314 A1* | 10/2019 | He | H04W 40/36 |

FOREIGN PATENT DOCUMENTS

| | | |
|---|---|---|
| WO | 2013183966 A1 | 12/2013 |
| WO | 2015103780 A1 | 7/2015 |
| WO | 2016010523 A1 | 1/2016 |
| WO | 2016019528 A1 | 2/2016 |
| WO | 2016136143 A1 | 9/2016 |

OTHER PUBLICATIONS

3GPP TS 23.501 V0.3.1 (Mar. 2017), 3rd Generation Partnership Project; Technical Specification Group Services and System Aspects; System Architecture for the 5G System; Stage 2 (Release 15), Mar. 2017, 97 pages.

ASUSTeK, "Consideration on intra NR RAT mobility," 3GPP TSG-RAN WG2 Meeting #95, R2-165131; Göteborg, Sweden, XP051126754, Aug. 22-26, 2016, 4 pages.

CATT, "Consideration on RAN interface for NR," 3GPP TSG RAN WG3 Meeting #92, R3-161155; Nanjing, China, May 23-27, 2016, 5 pages.

CMCC, "NR RAN functional description," 3GPP TSG RAN WG3 #92, R3-161267; Nanjing, China, May 23-27, 2016, 6 pages.

Extended European Search Report issued in European Application No. 18771339.1 dated Dec. 3, 2019, 12 pages.

PCT International Search Report and Written Opinion issued in International Application No. PCT/CN2018/080385 dated Jun. 13, 2018, 22 pages (with English translation).

Mediatek Inc, "RRC Inactive Location Tracking," 3GPP TSG RAN WG2 adhoc_2017_01_NR AH, R2-1700525, Spokane, USA, Jan. 17-19, 2017, 3 pages.

Office Action issued in Japanese Application No. 2019-552466 on Dec. 7, 2020, 9 pages (with English translation).

* cited by examiner

INFORMATION TRANSMISSION METHOD AND NETWORK DEVICE

CROSS-REFERENCE TO RELATED APPLICATIONS

This application is a continuation of International Application No. PCT/CN2018/080385, filed on Mar. 24, 2018, which claims priority to Chinese Patent Application No. 201710183327.0, filed on Mar. 24, 2017 and claims priority to Chinese Patent Application No. 201710909222.9, filed on Sep. 29, 2017, all of the aforementioned patent applications are hereby incorporated by reference in their entireties.

TECHNICAL FIELD

This application relates to the communications field, and more specifically, to an information transmission method and a network device.

BACKGROUND

In a cloud radio access network (Cloud Radio Access Network, CRAN) architecture, a split between a CRAN control node (Central Unit or Control Unit, CU) and a data unit (Data Unit or Distributed Unit, DU) in a CRAN is introduced. To be specific, an original baseband unit (Base Band Unit, BBU) that is integrally deployed is split into two parts. Compared with an original base station architecture, because of a CU-DU split, an CU-DU interface between the CU and the DU is introduced. Information originally exchanged inside a base station needs to be transferred through the CU-DU interface.

Some important wireless communication processes, such as a paging message (Paging) and system information transfer, are originally processed by the entire base station together. However, because the base station architecture is changed now, specific processing processes and processing modules need to be redesigned, and coordination between two modules obtained after a split is further required.

In a CU-DU split architecture, after being delivered through a core network, a paging message further needs to reach the DU via the CU through the CU-DU interface and is then sent to UE. Paging solution redesign and design solution optimization are required in all of the following: paging-related message determining, whether a paging range and a paging occasion are computed in the CU or the DU, a decision process implemented by a node of a network device in the prior art, information exchange through the CU-DU interface in the CU-DU architecture, a latency of the CU-DU interface, and how to implement an entire procedure.

A problem of sending a paging message and system information when some functions of a network device are distributed to different network nodes cannot be resolved in the prior art.

SUMMARY

This application provides an information transmission method and a network device, to optimize a manner of sending a paging message and a manner of sending system information when some functions of a network device are distributed to different network nodes.

According to a first aspect, an information transmission method is provided. The method includes: receiving, by a first network node, a first paging message sent by a second network node, where the first paging message includes first configuration information corresponding to a terminal device, the first paging message is sent by the second network node based on a second paging message that is sent by a core network node and that is used for paging the terminal device, and the second paging message includes the first configuration information; determining, by the first network node, a first paging configuration parameter based on the first configuration information and second configuration information, where the second configuration information is configuration information of a cell served by the first network node; and sending, by the first network node, a third paging message based on the first paging message and the first paging configuration parameter, where the third paging message is used for paging the terminal device.

With reference to the first aspect, in a first possible implementation of the first aspect, the first paging configuration parameter includes a paging range and a paging occasion.

According to the information transmission method in this embodiment of this application, computation of the paging configuration parameter is deployed in the first network node, so that a current system frame number can be obtained, and the paging range and the paging occasion can be computed in real time. In addition, a latency from the second network node to the first network node can be prevented from affecting accuracy in receiving a paging frame and the paging occasion by the terminal device.

With reference to the first aspect, in a second possible implementation of the first aspect, the first paging configuration parameter is a paging occasion, the first paging message further includes a second paging configuration parameter, and the second paging configuration parameter is a paging range; or the first paging configuration parameter is a paging range, the first paging message further includes a second paging configuration parameter, and the second paging configuration parameter is a paging occasion.

With reference to the second possible implementation of the first aspect, in a third possible implementation of the first aspect, before the first network node receives the second paging configuration parameter sent by the second network node, the method further includes: sending, by the first network node, the second configuration information to the second network node, so that the second network node determines the second paging configuration parameter.

With reference to the third possible implementation of the first aspect, in a fourth possible implementation of the first aspect, before the sending, by the first network node, the second configuration information to the second network node, the method further includes: receiving, by the first network node, request information sent by the second network node, where the request information is used by the second network node to request the second configuration information from the first network node.

With reference to the first aspect or the first possible implementation of the first aspect, in a fifth possible implementation of the first aspect, the first configuration information includes at least one of identification information of the terminal device, paging area information of the terminal device, a paging cycle of the terminal device, and a paging density, and the second configuration information includes at least one of identification information of the cell, a paging cycle of the cell, and a paging density; and the determining, by the first network node, a first paging configuration parameter based on the first configuration information and second configuration information includes: determining, by the first network node, the paging range and the paging occasion based on the identification information of the terminal device, the paging area information of the terminal device, the paging cycle of the terminal device, the paging density, the identification information of the cell, and the paging cycle of the cell.

In some possible implementations, the paging cycle of the terminal device is a discontinuous reception cycle of the terminal device, and/or the paging cycle of the cell is a discontinuous reception cycle of the cell.

In some possible implementations, the paging density is a quantity of paging occasions in each radio frame.

With reference to any one of the second to fourth possible implementations of the first aspect, in a sixth possible implementation of the first aspect, the first configuration information includes at least one of identification information of the terminal device, paging area information of the terminal device, a paging cycle of the terminal device, and a paging density, and the second configuration information includes at least one of identification information of the cell, a paging cycle of the cell, and a paging density; and the determining, by the first network node, a first paging configuration parameter based on the first configuration information and second configuration information includes: determining, by the first network node, the paging range or the paging occasion based on the identification information of the terminal device, the paging area information of the terminal device, the paging cycle of the terminal device, the paging density, the identification information of the cell, and the paging cycle of the cell.

In some possible implementations, the paging cycle of the terminal device is a discontinuous reception cycle of the terminal device, and/or the paging cycle of the cell is a discontinuous reception cycle of the cell.

With reference to any one of the first to sixth possible implementations of the first aspect, in a seventh possible implementation of the first aspect, the paging range includes the identification information of the cell; and/or the paging occasion includes information about a first subframe, and the information about the first subframe is used by the terminal device to determine to receive the third paging message in the first subframe.

According to the information transmission method in this embodiment of this application, a manner of sending the paging message can be optimized when some functions of a network device are distributed to different network nodes.

According to a second aspect, a network device is provided, and the network device includes a memory and a processor. The memory is configured to store an instruction, and the processor is configured to invoke the instruction in the memory, to perform the operations in the method in the first aspect or any possible implementation of the first aspect.

According to a third aspect, an information transmission method is provided. The method includes: receiving, by a second network node, a second paging message sent by a core network node, where the second paging message is used to page a terminal device, and the second paging message includes first configuration information corresponding to the terminal device; receiving, by the second network node, second configuration information sent by a first network node, where the second configuration information is configuration information of a cell served by the first network node; determining, by the second network node, a third paging configuration parameter based on the first configuration information and the second configuration information; and sending, by the second network node, a first paging message to the first network node based on the second paging message and the third paging configuration parameter, so that the first network node pages the terminal device.

According to the information transmission method in this embodiment of this application, a manner of sending the paging message can be optimized when some functions of a network device are distributed to different network nodes.

With reference to the third aspect, in a first possible implementation of the third aspect, before the receiving, by the second network node, second configuration information sent by a first network node, the method further includes: sending, by the second network node, request information to the first network node, where the request information is used to request the second configuration information from the first network node.

With reference to the third aspect or the first possible implementation of the third aspect, in a second possible implementation of the third aspect, the third paging configuration parameter is a paging range and/or a paging occasion.

With reference to the second possible implementation of the third aspect, in a third possible implementation of the third aspect, the first configuration information includes at least one of identification information of the terminal device, paging area information of the terminal device, a paging cycle of the terminal device, and a paging density, and the second configuration information includes at least one of identification information of the cell, a paging cycle of the cell, and a paging density; and the determining, by the second network node, a third paging configuration parameter based on the first configuration information and the second configuration information includes: determining, by the second network node, the paging range and/or the paging occasion based on the identification information of the terminal device, the paging area information of the terminal device, the paging cycle of the terminal device, the paging density, the identification information of the cell, and the paging cycle of the cell.

In some possible implementations, the paging cycle of the terminal device is a discontinuous reception cycle of the terminal device, and/or the paging cycle of the cell is a discontinuous reception cycle of the cell.

With reference to the second or third possible implementation of the third aspect, in a fourth possible implementation of the third aspect, the paging range includes the identification information of the cell; and/or the paging occasion includes information about a first subframe, and the information about the first subframe is used by the terminal device to determine to receive the third paging message in the first subframe.

According to a fourth aspect, a network device is provided, and the network device includes a memory and a processor. The memory is configured to store an instruction, and the processor is configured to invoke the instruction in the memory, to perform the operations in the method in the third aspect or any possible implementation of the third aspect.

According to a fifth aspect, an information transmission method is provided. The method includes: generating, by a first network node, first system information; and sending, by the first network node, the first system information to a terminal device, where the first network node is a data unit in a cloud radio access network or a super cell.

In some possible implementations, the first system information is on-demand system information or minimal system information.

With reference to the fifth aspect, in a first possible implementation of the fifth aspect, the method further includes: sending, by the first network node, the first system information to a second network node, where the second network node is a control node in the cloud radio access network or the super cell.

According to the information transmission method in this embodiment of this application, generation of the system information is deployed in the first network node, so that a current system frame number and an information element that is required for generating the system information can be obtained in time, the system information and an algorithm procedure that affects the system information can be controlled to take effect simultaneously, and some modules can be prevented from taking effect first. In addition, the following problem can be avoided: The current system frame number and a latency from the second network node to the first network node cannot be obtained in an eDRX scenario, affecting computation of the system information and generation of the frame number.

With reference to the fifth aspect or the first possible implementation of the fifth aspect, in a second possible implementation of the fifth aspect, the first system information is changed, and the method further includes: generating, by the first network node, changed system information; and sending, by the first network node, the changed system information to the terminal device.

In some possible implementations, the first system information is changed, and the first network node generates identification information of a cell and the changed system information.

With reference to the second possible implementation of the fifth aspect, in a third possible implementation of the fifth aspect, the method further includes: sending, by the first network node, the changed system information to the second network node.

According to the information transmission method in this embodiment of this application, a manner of sending the system information can be optimized when some functions of a network device are distributed to different network nodes.

According to a sixth aspect, a network device is provided, and the network device includes a memory and a processor. The memory is configured to store an instruction, and the processor is configured to invoke the instruction in the memory, to perform the operations in the method in the fifth aspect or any possible implementation of the fifth aspect.

According to a seventh aspect, an information transmission method is provided. The method includes: generating, by a second network node, first system information; and sending, by the second network node, the first system information to a first network node, where the first network node is a data unit in a cloud radio access network or a super cell, and the second network node is a control node in the cloud radio access network or the super cell.

With reference to the seventh aspect, in a first possible implementation of the seventh aspect, the first system information is changed, and the method further includes: receiving, by the second network node, changed system information sent by the first network node, where the changed system information is generated by the first network node; generating, by the second network node, second system information based on the changed system information; and sending, by the second network node, the second system information to the first network node.

According to an eighth aspect, a network device is provided, and the network device includes a memory and a processor. The memory is configured to store an instruction, and the processor is configured to invoke the instruction in the memory, to perform the operations in the method in the seventh aspect or any possible implementation of the seventh aspect.

According to a ninth aspect, a network device is provided. The network device includes: a transceiver module, configured to receive a first paging message sent by a second network node, where the first paging message includes first configuration information corresponding to a terminal device, the first paging message is sent by the second network node based on a second paging message that is sent by a core network node and that is used for paging the terminal device, and the second paging message includes the first configuration information; and a processing module, configured to determine, by the first network node, a first paging configuration parameter based on the first configuration information and second configuration information, where the second configuration information is configuration information of a cell served by the first network node. The transceiver module is further configured to send a third paging message based on the first paging message and the first paging configuration parameter under the control of the processing module, where the third paging message is used for paging the terminal device.

With reference to the ninth aspect, in a first possible implementation of the ninth aspect, the first paging configuration parameter includes a paging range and a paging occasion.

With reference to the ninth aspect, in a second possible implementation of the ninth aspect, the first paging configuration parameter is a paging occasion, the first paging message further includes a second paging configuration parameter, and the second paging configuration parameter is a paging range; or the first paging configuration parameter is a paging range, the first paging message further includes a second paging configuration parameter, and the second paging configuration parameter is a paging occasion.

With reference to the second possible implementation of the ninth aspect, in a third possible implementation of the ninth aspect, the transceiver module is further configured to send the second configuration information to the second network node, so that the second network node determines the second paging configuration parameter.

With reference to the third possible implementation of the ninth aspect, in a fourth possible implementation of the ninth aspect, the transceiver module is further configured to receive request information sent by the second network node, where the request information is used by the second network node to request the second configuration information from the first network node.

With reference to the ninth aspect or the first possible implementation of the ninth aspect, in a fifth possible implementation of the ninth aspect, the first configuration information includes at least one of identification information of the terminal device, paging area information of the terminal device, a paging cycle of the terminal device, and a paging density, and the second configuration information includes at least one of identification information of the cell, a paging cycle of the cell, and a paging density; and the processing module is specifically configured to determine the paging range and the paging occasion based on the identification information of the terminal device, the paging area information of the terminal device, the paging cycle of the terminal device, the paging density, the identification information of the cell, and the paging cycle of the cell.

In some possible implementations, the paging cycle of the terminal device is a discontinuous reception cycle of the terminal device, and/or the paging cycle of the cell is a discontinuous reception cycle of the cell.

With reference to any one of the second to fourth possible implementations of the ninth aspect, in a sixth possible implementation of the ninth aspect, the first configuration information includes at least one of identification information of the terminal device, paging area information of the terminal device, a paging cycle of the terminal device, and a paging density, and the second configuration information includes at least one of identification information of the cell, a paging cycle of the cell, and a paging density; and the processing module is specifically configured to determine the paging range or the paging occasion based on the identification information of the terminal device, the paging area information of the terminal device, the paging cycle of the terminal device, the paging density, the identification information of the cell, and the paging cycle of the cell.

In some possible implementations, the paging cycle of the terminal device is a discontinuous reception cycle of the terminal device, and/or the paging cycle of the cell is a discontinuous reception cycle of the cell.

With reference to any one of the first to sixth possible implementations of the ninth aspect, in a seventh possible implementation of the ninth aspect, the paging range includes the identification information of the cell; and/or the paging occasion includes information about a first subframe, and the information about the first subframe is used by the terminal device to determine to receive the third paging message in the first subframe.

According to a tenth aspect, a network device is provided. The network device includes: a transceiver module, configured to receive a second paging message sent by a core network node, where the second paging message is used to page a terminal device, and the second paging message includes first configuration information corresponding to the terminal device, where the transceiver module is further configured to receive second configuration information sent by a first network node, where the second configuration information is configuration information of a cell served by the first network node; and a processing module, configured to determine a third paging configuration parameter based on the first configuration information and the second configuration information. The transceiver module is further configured to send a first paging message to the first network node based on the second paging message and the third paging configuration parameter under the control of the processing module, so that the first network node pages the terminal device.

With reference to the tenth aspect, in a first possible implementation of the tenth aspect, the transceiver module is further configured to send request information to the first network node, where the request information is used to request the second configuration information from the first network node.

With reference to the tenth aspect or the first possible implementation of the tenth aspect, in a second possible implementation of the tenth aspect, the third paging configuration parameter is a paging range and/or a paging occasion.

With reference to the second possible implementation of the tenth aspect, in a third possible implementation of the tenth aspect, the first configuration information includes at least one of identification information of the terminal device, paging area information of the terminal device, a paging cycle of the terminal device, and a paging density, and the second configuration information includes at least one of identification information of the cell, a paging cycle of the cell, and a paging density; and the processing module is specifically configured to determine the paging range and/or the paging occasion based on the identification information of the terminal device, the paging area information of the terminal device, the paging cycle of the terminal device, the paging density, the identification information of the cell, and the paging cycle of the cell.

In some possible implementations, the paging cycle of the terminal device is a discontinuous reception cycle of the terminal device, and/or the paging cycle of the cell is a discontinuous reception cycle of the cell.

With reference to the second or third possible implementation of the tenth aspect, in a fourth possible implementation of the tenth aspect, the paging range includes the identification information of the cell; and/or the paging occasion includes information about a first subframe, and the information about the first subframe is used by the terminal device to determine to receive the third paging message in the first subframe.

According to an eleventh aspect, a network device is provided. The network device includes: a processing module, configured to generate first system information; and a transceiver module, configured to send the first system information to a terminal device, where the processing module and the transceiver module are modules in a data unit in a cloud radio access network or a super cell.

With reference to the eleventh aspect, in a first possible implementation of the eleventh aspect, the transceiver module is further configured to send the first system information to a second network node, where the second network node is a control node in the cloud radio access network or the super cell.

With reference to the eleventh aspect or the first possible implementation of the eleventh aspect, in a second possible implementation of the eleventh aspect, the first system information is changed, and the processing module is further configured to generate changed system information; and the transceiver module is further configured to send the changed system information to the terminal device.

With reference to the second possible implementation of the eleventh aspect, in a third possible implementation of the eleventh aspect, the transceiver module is further configured to send the changed system information to the second network node.

According to a twelfth aspect, a network device is provided. The network device includes: a processing module, configured to generate first system information; and a transceiver module, configured to send the first system information to a first network node, where the first network node is a data unit in a cloud radio access network or a super cell, and the processing module and the transceiver module are modules in a control node in the cloud radio access network or the super cell.

With reference to the twelfth aspect, in a first possible implementation of the twelfth aspect, the first system information is changed, and the transceiver module is further configured to receive changed system information sent by the first network node, where the changed system information is generated by the first network node; the processing module is further configured to generate second system information based on the changed system information; and the transceiver module is further configured to send the second system information to the first network node.

According to a thirteenth aspect, a computer readable storage medium is provided. The computer readable storage medium stores an instruction, and when the instruction is run on a computer, the computer performs the methods in the foregoing aspects.

According to a fourteenth aspect, a system chip is provided. The system chip includes an input/output interface, at least one processor, at least one memory, and a bus. The at least one memory is configured to store an instruction, and the at least one processor is configured to invoke the instruction in the at least one memory, to perform the operations in the methods in the foregoing aspects.

DESCRIPTION OF EMBODIMENTS

The following describes the technical solutions of this application with reference to the accompanying drawings.

Figure 1:
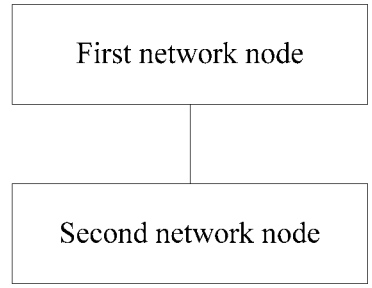
FIG. 1 is a schematic diagram of an application scenario of a technical solution according to an embodiment of this application.

The embodiments of this application are applicable to various forms of systems in which some functions of a network device are separated. FIG. 1 is a schematic diagram of an application scenario of a technical solution according to an embodiment of this application. As shown in FIG. 1, some functions of the network device are distributed to a first network node and a second network node.

Figure 2:
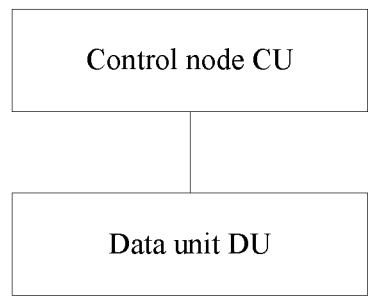
FIG. 2 is a schematic diagram of another application scenario of a technical solution according to an embodiment of this application.

Specifically, FIG. 2 is a schematic diagram of another application scenario of a technical solution according to an embodiment of this application. As shown in FIG. 2, in a CRAN architecture, a CU-DU split is introduced. A DU may correspond to the first network node in FIG. 1, and a CU may correspond to the second network node in FIG. 1.

It should be understood that the first network node and the second network node may be two physically or logically separated modules in a complete network architecture, or may be two completely independent logical network elements.

The CU has RRC functions or some RRC functions, and includes all protocol layer functions or some protocol layer functions of an existing base station. For example, the CU includes only all RRC functions or some RRC functions, or includes RRC/PDCP layer functions, or includes RRC/PDCP functions and some RLC functions, or includes RRC/PDCP/MAC functions and even some or all PHY functions. This does not exclude any other possibility.

The DU has all or some protocol layer functions of an existing base station, namely, some protocol layer functions of RRC/PDCP/RLC/MAC/PHY. For example, the DU includes protocol layer functions of PDCP/RLC/MAC/PHY and the like, or includes protocol layer functions of RLC/MAC/PHY and the like, or includes some RLC/MAC/PHY functions, or includes only all or some PHY functions. It should be noted that each of the protocol layer functions mentioned herein may be changed, and the change falls within the protection scope of the present invention.

It should be understood that the technical solutions in the embodiments of this application may be applied to various communications systems, such as a global system for mobile communications (Global System of Mobile Communication, GSM) system, a code division multiple access (Code Division Multiple Access, CDMA) system, a wideband code division multiple access (Wideband Code Division Multiple Access, WCDMA) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunication System, UMTS), a future 5th generation (5th-Generation, 5G) communications system, and a CRAN communications system.

It should be further understood that a network device in the embodiments of this application may be a device configured to communicate with a terminal device. For example, the network device may be a combination of a base transceiver station (Base Transceiver Station, BTS) and a base station controller (Base Station Controller, BSC) in a GSM system or a CDMA system, may be a combination of a NodeB (NodeB, NB) and a radio network controller (Radio Network Controller, RNC) in a WCDMA system, or may be an evolved NodeB (Evolutional Node B, eNB or eNodeB) in an LTE system. Alternatively, the network device may be a relay station, an access point, an in-vehicle device, a wearable device, an access network device in a future 5G network, for example, a next generation base station, an access network device in a future evolved public land mobile network (Public Land Mobile Network, PLMN), or the like.

Specifically, a scenario in which a wireless network control node is separated from a base station exists in a UMTS system in a 3rd generation (3rd-Generation, 3G)

mobile communications technology. The following scenarios exist in an LTE system: a scenario in which a baseband module is separated from a radio frequency module, namely, a remote radio scenario; a data center (Data Center, DC) scenario in which two different networks need to be interconnected; a macro-micro base station scenario in which a macro base station and a micro base station are connected to each other through an interface; and an LTE-WiFi aggregation (LTE-Wife aggregation, LWA) scenario. The following scenarios exist in a 5G system: various non-cell (non-cell) scenarios (a terminal may be freely handed over between cells, and no clear boundary exists between the cells) in which a control node is connected to all cells, or a cell is connected to various transmission nodes; a CRAN scenario in which a BBU is split; and a CRAN virtualization scenario in which some functions of a BBU are deployed together and virtualized, and the other functions are deployed separately and may be physically separated from the functions that are deployed together and virtualized. It should be understood that scenarios in which different systems/standards coexist all fall within the application scope of this application.

This application describes the embodiments with reference to a terminal device. The terminal device may alternatively be user equipment (User Equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, an in-vehicle device, a wearable device, a terminal device in a future 5G network or a terminal device in a PLMN, or the like.

Figure 3:
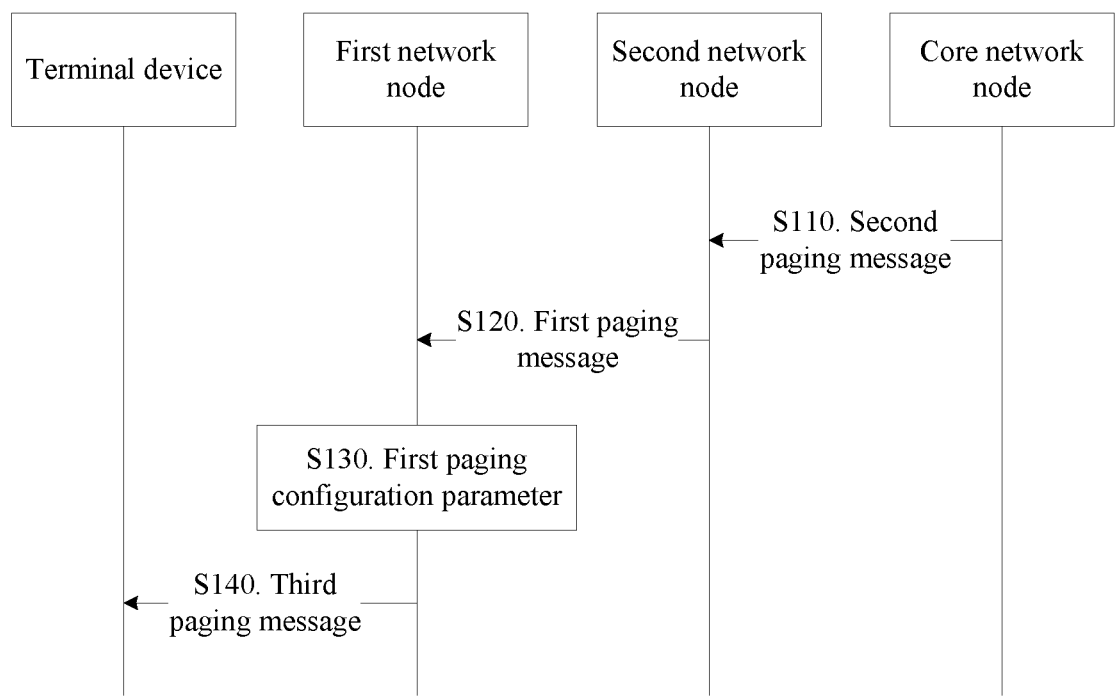
FIG. 3 is a schematic flowchart of an information transmission method according to an embodiment of this application.

FIG. 3 is a schematic flowchart of an information transmission method 100 according to an embodiment of this application. The first network node may correspond to the DU in FIG. 2, and the second network node may correspond to the CU in FIG. 2. As shown in FIG. 3, the method 100 includes the following steps.

S110. The second network node receives a second paging message sent by a core network node, where the second paging message is used to page a terminal device, and the second paging message includes first configuration information corresponding to the terminal device.

Specifically, the core network node sends, based on paging area information that is of the terminal device and that is maintained by the core network node, the second paging message to the second network node related to the terminal device. The second paging message is used for paging the terminal device, and the paging area information of the terminal device may be a paging tracking area list (Tracking Area List, TAL) or cell tracking information related to the terminal device.

It should be understood that the second paging message includes the first configuration information corresponding to the terminal device. The first configuration information includes at least one of the following information: identification information of the terminal device, the paging area information of the terminal device, a paging cycle of the terminal device, and a paging density. However, this embodiment of this application is not limited thereto.

It should be further understood that the identification information of the terminal device, the paging area information of the terminal device, the paging cycle of the terminal device, and the paging density may be information carried in the first configuration information, may be information generated by the second network node, or may be information generated by the first network node. This application is not limited thereto.

Optionally, the paging cycle of the terminal device may be a discontinuous reception (Discontinuous Reception, DRX) cycle of the terminal device, or may be other information related to the paging cycle. This application is not limited thereto.

It should be further understood that the first configuration information includes but is not limited to priority information of a paging message, the identification information of the terminal device, the discontinuous reception cycle of the terminal device, a superframe DRX (eDRX) cycle, the TAL of the terminal device, the paging density, and cell identity range (Physical Cell ID Range, CSG ID) information.

S120. The second network node sends a first paging message to the first network node, where the first paging message includes the first configuration information corresponding to the terminal device.

S130. The first network node determines a first paging configuration parameter based on the first configuration information and second configuration information, where the second configuration information is configuration information of a cell served by the first network node.

Optionally, the first paging configuration parameter includes a paging range and a paging occasion.

Specifically, in S110, after receiving the second paging message sent by the core network node, the second network node makes no modification to the second paging message, and transparently transmits the second paging message to the first network node. To be specific, the first paging message is the second paging message. After the second network node transparently transmits, to the first network node, the second paging message that is delivered by the core network node and that carries the first configuration information, the first network node determines the paging range and the paging occasion based on the first configuration information and the configuration information that is of the cell and that is stored by the first network node.

For example, in a CRAN or a super cell, when a paging message is sent in a CU-DU architecture, a CU first receives the second paging message delivered by a core network, where the second paging message carries the first configuration information used to page the terminal device; the CU transparently transmits the second paging message to a DU; the DU computes the paging range and the paging occasion based on the first configuration information in the second paging message and the configuration information that is of the cell and that is stored by the DU; and the DU sends a third paging message to the terminal device based on the second paging message and the computed paging range and paging occasion, where the third paging message is used for paging the terminal device.

Optionally, the first configuration information includes at least one of identification information of the terminal device, paging area information of the terminal device, a paging cycle of the terminal device, and a paging density, and the second configuration information includes at least one of identification information of the cell, a paging cycle of the cell, and a paging density. That the first network node determines a first paging configuration parameter based on the first configuration information and second configuration information includes the following:

the first network node determines the paging range and the paging occasion based on the identification information of the terminal device, the paging area information of the terminal device, the paging cycle of the terminal device, the paging density, the identification information of the cell, and the paging cycle of the cell.

It should be understood that the paging density is a quantity of paging occasions in each radio frame.

Specifically, in a paging DRX cycle, the first network node determines a paging frame (Paging Frame, PF) and the paging occasion (Paging Occasion, PO) by using the first configuration information and the second configuration information, including but not limited to the identification information of the terminal device, the paging area information of the terminal device, the DRX cycle of the terminal device, the paging density, the identification information of the cell, and the DRX cycle of the cell. The terminal device may monitor a physical dedicated control channel (Physical Dedicated Control Channel, PDCCH) in a PO of a PF in the paging cycle of the terminal device. The terminal device can read a corresponding paging message by using a paging radio network temporary identifier (Paging-Radio Network Temporary Identifier, P-RNTI) on the PDCCH and a corresponding frequency resource and encoding format indication.

Determining the paging range mainly means determining the paging frame. Herein, the paging density indicates a quantity of POs included in each DRX cycle. The paging density is involved in determining both the paging range and the paging occasion. A quantity of PFs included in each DRX cycle is used in determining the paging range, and a quantity of POs included in each PF is used in determining the paging occasion. These parameters are all determined based on the paging density and the DRX cycle.

Alternatively, determining the paging range mainly means determining the identification information of the cell corresponding to the terminal device, and determining the paging occasion mainly includes determining the PF and the PO.

Alternatively, determining the paging range mainly means determining the PF and the identification information of the cell corresponding to the terminal device, and determining the paging occasion mainly includes determining the PO.

S140. The first network node sends a third paging message based on the first paging message and the first paging configuration parameter, where the third paging message is used for paging the terminal device.

Optionally, the paging range includes the identification information of the cell; and/or the paging occasion includes information about a first subframe, and the information about the first subframe is used by the terminal device to determine to receive the third paging message in the first subframe.

According to the information transmission method in this embodiment of this application, computation of the paging configuration parameter is deployed in the first network node, so that a current system frame number can be obtained, and the paging range and the paging occasion can be computed in real time. In addition, a latency from the second network node to the first network node can be prevented from affecting accuracy in receiving the paging frame and the paging occasion by the terminal device.

Figure 4:
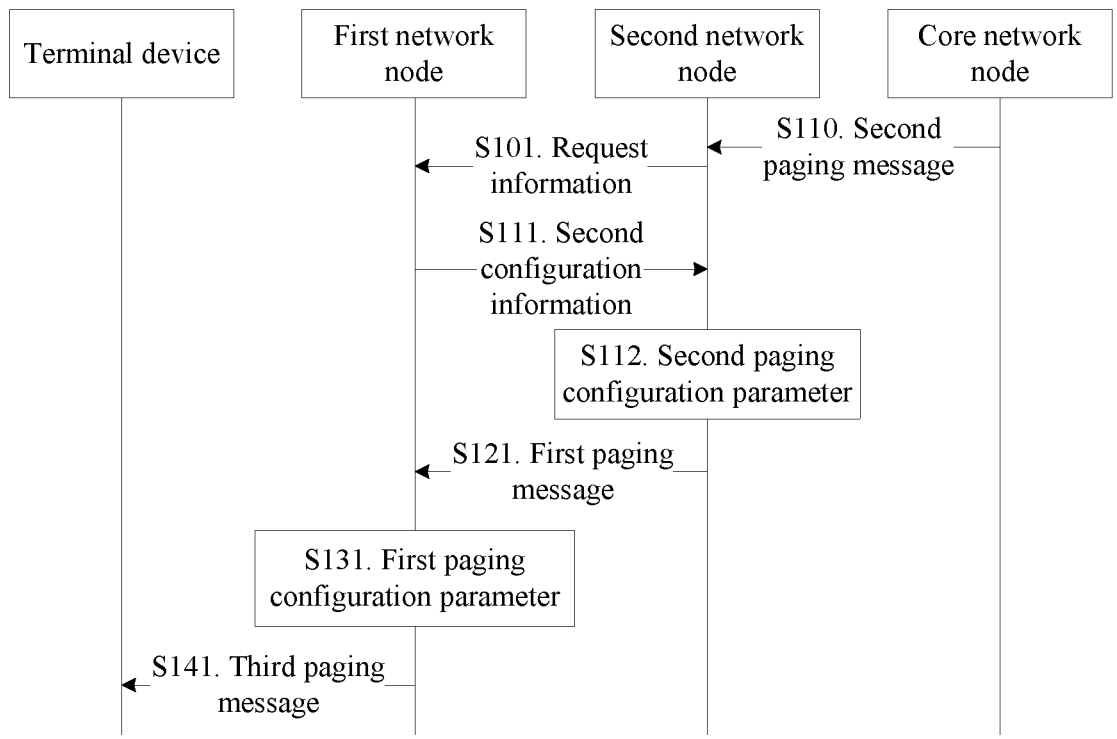
FIG. 4 is another schematic flowchart of an information transmission method according to an embodiment of this application.

Optionally, the first paging configuration parameter is a paging occasion, the first paging message further includes a second paging configuration parameter, and the second paging configuration parameter is a paging range; or the first paging configuration parameter is a paging range, the first paging message further includes a second paging configuration parameter, and the second paging configuration parameter is a paging occasion. FIG. 4 is another schematic flowchart of the information transmission method 100 according to an embodiment of this application. As shown in FIG. 4, the method 100 includes the following steps.

S111. The second network node receives the second configuration information sent by the first network node, where the second configuration information is the configuration information of the cell served by the first network node.

S112. The second network node determines the second paging configuration parameter based on the first configuration information and the second configuration information, where the second paging configuration parameter is the paging occasion or the paging range.

S121. The second network node sends the first paging message to the first network node based on the second paging message and the second paging configuration parameter, so that the first network node pages the terminal device.

S131. The first network node determines the first paging configuration parameter based on the first configuration information and the second configuration information, where the first paging configuration parameter is the paging range or the paging occasion.

It should be understood that if the second paging configuration parameter in S112 is the paging occasion, the first paging configuration parameter in S131 is the paging range. Alternatively, if the second paging configuration parameter in S112 is the paging range, the first paging configuration parameter in S131 is the paging occasion.

Specifically, in S110, after the second network node receives the second paging message sent by the core network node, the second network node further receives the second configuration information sent by the first network node. The second network node determines the second paging configuration parameter, that is, the paging occasion or the paging range, based on the first configuration information and the second configuration information. The second network node sends the first paging message to the first network node based on the second paging message and the second paging configuration parameter, where the first paging message carries the paging occasion or the paging range. The first network node determines the first paging configuration parameter, that is, the paging range or the paging occasion, based on the first configuration information and the second configuration information.

For example, in a CRAN or a super cell, when a paging message is sent in a CU-DU architecture, a CU receives the second paging message delivered by a core network, where the second paging message carries the first configuration information used to page the terminal device; the CU further receives the second configuration information sent by a DU; the CU may determine the paging occasion or the paging range based on the first configuration information and the second configuration information, and then sends the first paging message to the DU based on the second paging message and the paging occasion or the paging range, where the first paging message carries the paging occasion or the paging range; and after receiving the first paging message, the DU determines the paging range or the paging occasion based on the second configuration information and the first configuration information that are stored by the DU, and then sends a third paging message to the terminal device based on the first paging message and the paging range or the paging occasion, where the third paging message is used for paging the terminal device.

It should be understood that there is no sequence for S110 in which the second network node receives the second paging message and S111 in which the second network node receives the second configuration information.

Optionally, the first configuration information includes at least one of identification information of the terminal device, paging area information of the terminal device, a paging cycle of the terminal device, and a paging density, and the second configuration information includes at least one of identification information of the cell, a paging cycle of the cell, and a paging density. That the first network node determines a first paging configuration parameter based on the first configuration information and second configuration information includes the following:

the first network node determines the first paging configuration parameter (the paging range or the paging occasion) based on the identification information of the terminal device, the paging area information of the terminal device, the paging cycle of the terminal device, the paging density, the identification information of the cell, and the paging cycle of the cell.

It should be further understood that the second network node determines the second paging configuration parameter (the paging occasion or the paging range) based on the first configuration information and the second configuration information, including but not limited to the identification information of the terminal device, the paging area information of the terminal device, a DRX cycle of the terminal device, the paging density, the identification information of the cell, and a DRX cycle of the cell.

S141. The first network node sends the third paging message based on the first paging message and the first paging configuration parameter, where the third paging message is used for paging the terminal device.

It should be understood that S111 in which the second network node receives the second configuration information sent by the first network node may alternatively be completed in advance of a paging process. The first network node and the second network node may exchange the second configuration information in advance in the following two manners:

Manner 1: The second network node requests the second configuration information from the first network node, and the second configuration information includes information about the DRX cycle of the cell.

Manner 2: The first network node periodically sends the second configuration information to the second network node, and the second configuration information includes information about the DRX cycle of the cell.

Optionally, if Manner 1 is used, before the second network node receives the second configuration information sent by the first network node, the method 100 further includes the following step:

S101. The second network node sends request information to the first network node, where the request information is used to request the second configuration information from the first network node.

According to the information transmission method in this embodiment of this application, a manner of sending the paging message can be optimized when some functions of a network device are distributed to different network nodes.

Figure 5:
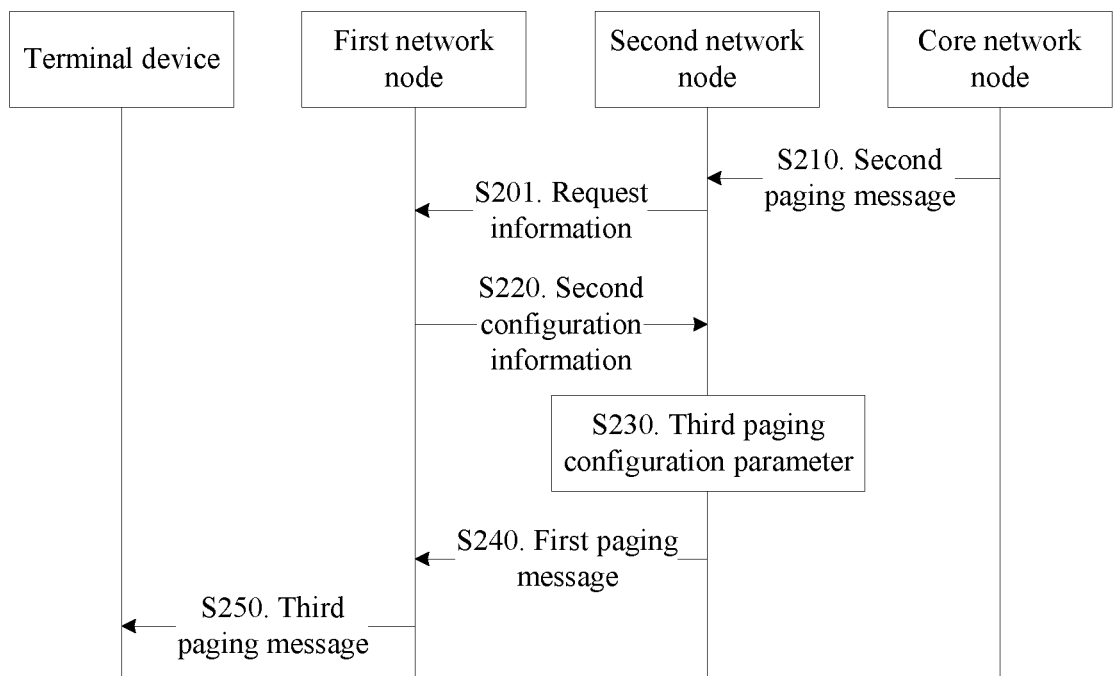
FIG. 5 is still another schematic flowchart of an information transmission method according to an embodiment of this application.

FIG. 5 is a schematic flowchart of an information transmission method 200 according to an embodiment of this application. As shown in FIG. 5, the method 200 includes the following steps:

S210. A second network node receives a second paging message sent by a core network node, where the second paging message is used to page a terminal device, and the second paging message includes first configuration information corresponding to the terminal device.

S220. The second network node receives second configuration information sent by a first network node, where the second configuration information is configuration information of a cell served by the first network node.

S230. The second network node determines a third paging configuration parameter based on the first configuration information and the second configuration information.

S240. The second network node sends a first paging message to the first network node based on the second paging message and the third paging configuration parameter.

S250. The first network node sends a third paging message based on the first paging message, where the third paging message is used for paging the terminal device.

Optionally, the third paging configuration parameter includes a paging range and a paging occasion.

Specifically, the second network node receives the second paging message sent by the core network node and the second configuration information sent by the first network node. The second paging message includes the first configuration information corresponding to the terminal device, and the second configuration information includes the configuration information of the cell. The second network node determines the paging range and the paging occasion based on the first configuration information and the second configuration information, and then the second network node sends the first paging message to the first network node based on the second paging message, the paging range, and the paging occasion. The first paging message carries the paging range and the paging occasion. The first network node transparently transmits the first paging message to the terminal device. To be specific, the third paging message is the first paging message. The third paging message is used for paging the terminal device.

For example, in a CRAN or a super cell, when a paging message is sent in a CU-DU architecture, a CU receives the second paging message delivered by a core network, where the second paging message carries the first configuration information used to page the terminal device; the CU further receives the second configuration information sent by a DU; the CU may determine the paging range and the paging occasion based on the first configuration information and the second configuration information, and then sends the first paging message to the DU based on the second paging message, the paging range, and the paging occasion, where the first paging message carries the paging range and the paging occasion; and after receiving the first paging message, the DU transparently transmits the first paging message to the terminal device, to page the terminal device.

It should be understood that there is no sequence for S210 in which the second network node receives the second paging message sent by the core network node and S220 in which the second network node receives the second configuration information sent by the first network node.

It should be further understood that after the second network node sends the first paging message to the first network node, the first network node transparently transmits the first paging message to the terminal device. To be specific, the third paging message is the first paging message.

Optionally, the third paging configuration parameter includes the paging range or the paging occasion.

It should be understood that the second network node may determine only the paging range; then the second network node sends the first paging message to the first network node based on the second paging message and the paging range; and the first network node determines the paging occasion based on the first paging message and the second configuration information stored by the first network node. Alternatively, the second network node may determine only the paging occasion; then the second network node sends the first paging message to the first network node based on the second paging message and the paging occasion; and the first network node determines the paging range based on the first paging message and the second configuration information stored by the first network node. This is the same as the method described in FIG. 4. For brevity, details are not described herein again.

It should be understood that S220 in which the second network node receives the second configuration information sent by the first network node may alternatively be completed in advance of a paging process. The first network node and the second network node may exchange the second configuration information in advance in the following two manners:

Manner 1: The second network node requests the second configuration information from the first network node, and the second configuration information includes information about a DRX cycle of the cell.

Manner 2: The first network node periodically sends the second configuration information to the second network node, and the second configuration information includes information about a DRX cycle of the cell.

Optionally, if Manner 1 is used, before the second network node receives the second configuration information sent by the first network node, the method 200 further includes the following step:

S201. The second network node sends request information to the first network node, where the request information is used to request the second configuration information from the first network node.

According to the information transmission method in this embodiment of this application, a manner of sending the paging message can be optimized when some functions of a network device are distributed to different network nodes.

Figure 6:
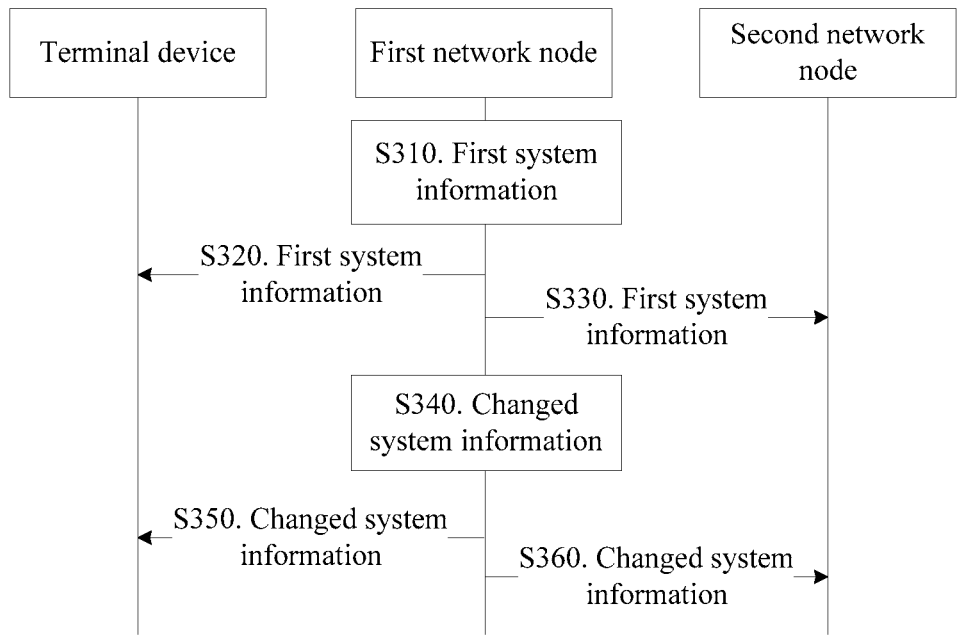
FIG. 6 is still another schematic flowchart of an information transmission method according to an embodiment of this application.

FIG. 6 is a schematic flowchart of an information transmission method 300 according to an embodiment of this application. As shown in FIG. 6, the method 300 includes the following steps:

S310. A first network node generates first system information.

S320. The first network node sends the first system information to a terminal device.

The first network node is a data unit in a cloud radio access network or a super cell.

Specifically, when some functions of a network device are distributed to different network nodes, for example, are distributed to the first network node and the second network node, the first system information may be generated by the first network node and directly delivered to the terminal device by using the first network node.

For example, in a CRAN or a super cell, when system information is sent in a CU-DU architecture, the first system information may be generated by a DU, and the generated first system information may be directly delivered to the terminal device by using the DU.

It should be understood that the information transmission method may be applied to generation and sending of various types of system information, including but not limited to on-demand system information (On-demand SI) and minimal system information (Minimal SI).

For example, in a CRAN or a super cell, for the minimal SI, that is, system information that is usually not updated, the minimal SI can be directly generated by a DU and directly sent to the terminal device.

According to the information transmission method in this embodiment of this application, generation of the system information is deployed in the first network node, so that a current system frame number and an information element that is required for generating the system information can be obtained in time, an algorithm procedure that affects the system information and the system information can be controlled to take effect simultaneously, and some modules can be prevented from taking effect first. In addition, the following problem can be avoided: The current system frame number and a latency from the second network node to the first network node cannot be obtained in an eDRX scenario, affecting computation of the system information and generation of the frame number.

Optionally, the method 300 further includes the following step:

S330. The first network node sends the first system information to a second network node, where the second network node is a control node in the cloud radio access network or the super cell.

For example, in some scenarios (switching scenarios), the second network node (a CU) needs to know related system information.

Optionally, the first system information is changed, and the method 300 further includes the following steps:

S340. The first network node generates changed system information.

S350. The first network node sends the changed system information to the terminal device.

Optionally, in S340, the first network node generates identification information of a cell and the changed system information.

Optionally, the method 300 further includes the following step:

S360. The first network node sends the changed system information to the second network node.

For example, in a CRAN or a super cell, when a DU determines that the system information is changed, the DU sends the changed system information and the identification information of the cell to the terminal device.

For another example, in a CRAN or a super cell, because a DU controls all information about the cell, when the information about the cell changes, transmission of the on-demand SI may be triggered. After generating the changed system information and the identification information of the cell, the DU sends the changed system information to the terminal device. Further, the DU sends the changed system information and the identification information of the cell to a CU.

It should be understood that there is no sequence for S350 in which the first network node sends the changed system information to the terminal device and S360 in which the first network node sends the changed system information to the second network node.

According to the information transmission method in this embodiment of this application, a manner of sending the system information can be optimized when some functions of a network device are distributed to different network nodes.

Figure 7:
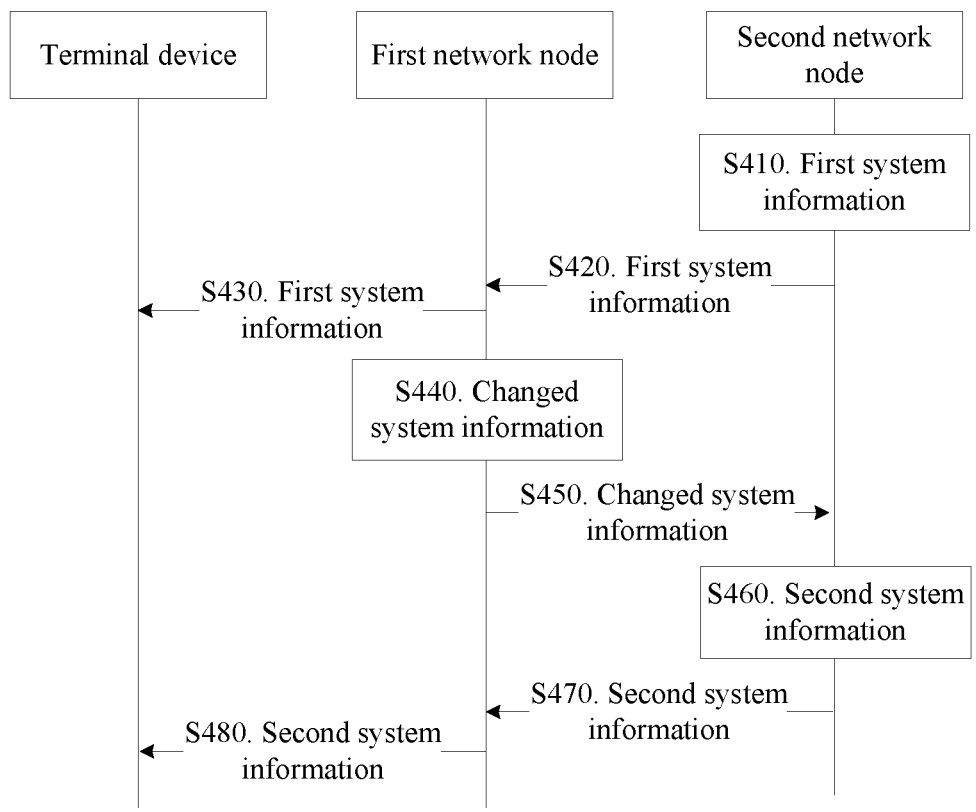
FIG. 7 is still another schematic flowchart of an information transmission method according to an embodiment of this application.

FIG. 7 is a schematic flowchart of an information transmission method 400 according to an embodiment of this application. As shown in FIG. 7, the method 400 includes the following steps:

S410. A second network node generates first system information.

S420. The second network node sends the first system information to a first network node.

S430. The first network node sends the first system information to a terminal device.

The first network node is a data unit in a cloud radio access network or a super cell, and the second network node is a control node in the cloud radio access network or the super cell.

Specifically, when some functions of a network device are distributed to different network nodes, for example, are distributed to the first network node and the second network node, the first system information may be generated by the second network node and sent to the first network node by using the second network node, and the first network node transparently transmits the first system information to the terminal device.

For example, in a CRAN or a super cell, when system information is sent in a CU-DU architecture, the first system information may be generated by a CU, and the generated first system information may be sent by the CU to a DU, and transparently transmitted to the terminal device.

For another example, in a CRAN or a super cell, for minimal SI, that is, system information that is usually not updated, the system information may be directly sent by a CU to a DU for transparent transmission.

Optionally, the first system information is changed, and the method 400 further includes the following steps:

S440. The first network node generates changed system information.

S450. The second network node receives the changed system information sent by the first network node, where the changed system information is generated by the first network node.

S460. The second network node generates second system information based on the changed system information.

S470. The second network node sends the second system information to the first network node.

S480. The first network node sends the second system information to the terminal device.

Optionally, in S440, the first network node generates identification information of a cell and the changed system information. In S450, the first network node sends the changed system information and the identification information of the cell to the second network node.

For example, in a CRAN or a super cell, when a DU determines that the system information is changed, the DU sends the changed system information and the identification information of the cell to a CU, the CU generates the second system information, the CU sends the second system information to the DU, and the DU transparently transmits the second system information to the terminal device.

For another example, in a CRAN or a super cell, because a DU controls all information about the cell, when the information about the cell changes, transmission of on-demand SI may be triggered. After generating the changed system information and the identification information of the cell, the DU sends the updated system information and the identification information of the cell to a CU, the CU may generate the second system information and send the second system information to the DU, and the DU transparently transmits the second system information to the terminal device.

According to the information transmission method in this embodiment of this application, a manner of sending the system information can be optimized when some functions of a network device are distributed to different network nodes.

Referring to or with reference to the methods in the foregoing embodiments of this application, this application further provides the following embodiments including the following design ideas:

1. Some system information is generated in a CU, some system information is generated in a DU, and the system information is encoded in the CU.

2. Some system information is generated in a CU, some system information is generated in a DU, and the system information is encoded in the DU.

3. Some system information is generated and encoded in a CU, and some system information is generated and encoded in a DU.

4. System information is generated in a CU, and the system information is encoded in the CU.

5. System information is generated in a DU, and the system information is encoded in the DU.

One or a combination of any two or more ideas may be selected from the foregoing design ideas for use. Types of system information (system information, SI) used herein may include a master information block (Master Information Block, MIB), a system information block (System Information Block 1, SIB 1), and other defined system information (for example, a SIB 2 to a SIB 22 numbered 2 to 22). The SI may be alternatively divided into a minimum system information (minimum SI, MSI) and other system information (other SI) based on a sending manner. The MSI mainly includes the MIB and the SIB 1. Particularly, the other SI may be requested on demand, and a base station may send the requested other SI through broadcast or dedicated RRC signaling. The system information may be divided into a plurality of system information blocks (block). SIBs included in each SI block may be specified by a protocol, or may be specifically determined by the base station. If the SIBs included in the SI block are determined by the base station, the base station needs to broadcast the SIBs in the MSI to inform UE.

Optionally, the some system information described herein may be a complete system information block SI block, or may be some information or some parameters in an SI block/a SIB. The some system information described herein is generated in the CU or the DU. For example, SIBs 1 to 15 (SIBs numbered 1 to 15) are generated by the DU, and SIBs 16 to 23 (SIBs numbered 16 to 23) are generated by the CU. For another example, an information element (information element, IE) 1, an IE 5, and an IE 10 in the SIB 2 (the SIB numbered 2) are generated by the DU, and an IE 2, an IE 3, an IE 4, an IE 6, an IE 7, an IE 8, and an 1E9 in the SIB 2 are generated by the CU. Alternatively, for example, an SI block 1 includes SIBs 2 to 4, a SIB block 2 includes SIBs 5 to 10, and a SIB block 3 includes SIBs 11 to 22. It is possible that the SI block 1 is generated by the DU, and the SI block 2 and the SI block 3 are generated by the CU. By analogy, parameters in other SIBs can also be designed based on a similar idea.

According to the embodiments of the present invention, it is assumed that the CU and the DU respectively generate some system information or some parameters of system information, and the DU finally encodes all system information.

For example, through preconfiguration by an operation, administration, and maintenance (operation, administration, and maintenance, OAM) system, some complete SI/SIBs generated on a CU side or parameters in some SI/SIBs generated on a CU side are pre-configured to the DU. In this way, the DU stores all system information. For another example, when the SI/SIBs on the CU side or the parameters in the SI/SIBs are changed subsequently, the CU provides updated SI/SIBs or updated parameters in the SI/SIBs to the DU. "SI" herein is "SI block". "SI" and "SI block" can be used interchangeably.

Optional Specific Example 1

The CU provides some system information or some parameters of system information to the DU, and the DU finally encodes final system information.

In a feasible design, the CU may provide a system information parameter to the DU. For the system information parameter, a SIParaContainer (a system information container) is used herein as an example for description. A meaning of the container described herein may be as follows: Information is encapsulated in a transmission process, and content in the container is invisible to an F1 interface (an interface between the CU and the DU), but is visible to the DU. Optionally, information included in the SIParaContainer is sorted and encoded based on sizes of SIB identifiers and/or a sequence of IEs in SIBs. For example, in the SIParaContainer, an IE 1, an IE 2, and an IE 3 correspond to an IE 5, an IE 7, and an IE 10 in an actual SIB 1; an IE 4 and an IE 5 correspond to an IE 2 and an IE 4 in an actual SIB 2; an IE 6 corresponds to an IE 9 in a SIB 3, and so on. A correspondence between an IE in the SIParaContainer and an IE in an actual SIB may be described by using the following table. For example, a correspondence between an IE in the SIParaContainer, a SIB identifier, and an IE identifier in a SIB is shown in Table 1.

TABLE 1

| IE | Corresponding SIB identifier | Corresponding IE identifier in a SIB |
|---|---|---|
| 1 | 1 | 5 |
| 2 | 1 | 7 |
| 3 | 1 | 10 |
| 4 | 2 | 2 |
| 5 | 2 | 4 |
| 6 | 3 | 9 |
| 7 | 4 | 2 |
| 8 | 4 | 6 |
| 9 | 4 | 7 |
| 10 | 5 | 3 |
| 11 | 5 | 6 |
| 12 | 6 | 2 |

Optionally, after receiving the SIParaContainer, the DU puts a corresponding IE into a corresponding IE location in a corresponding SIB, then puts remaining system information parameters generated by the DU into corresponding IE locations, and encodes final complete system information. The correspondence may be specified by a protocol, or the correspondence may be provided on the F1 interface, for example, may be transmitted via an F1 interface control plane or an F1 interface user plane. When the correspondence is sent via the F1 interface control plane, the following content may be sent by using a system information-related message provided by the CU to the DU, for example, may be sent by using a downlink system information transmission message or a system information update message. If the correspondence is specified by the protocol, a SIParaContainer encoded by ASN.1 can be directly transmitted on the F1 interface. If the correspondence is provided on the F1 interface, in a possible manner, the system information parameter provided by the CU to the DU is the SIParaContainer that has been encoded by the ASN.1. In addition, a correspondence between an IE in the SIParaContainer, an actual SI/SIB identifier, and an IE in SI/a SIB needs to be indicated on the F1 interface. Optionally, a specific F1 interface message format may be as follows:

SIParaContainer
IE list
>IE i
>Corresponding SI/SIB identifier
>Corresponding IE identifier in SI/a SIB IE i is an IE identifier of the IE in the SIParaContainer, and the corresponding IE identifier in the SI/SIB is an IE identifier in SI/a SIB indicated by the "corresponding SI/SIB identifier". For example, as shown in the table, a SIB identifier corresponding to the IE 5 is 2, and a corresponding IE identifier in a SIB is 4.

In another possible implementation, the CU provides an SI type+SI container to the DU, or the CU provides a SIB type+SIB container to the DU. The SI container may be a complete SI message, for example, SI 1 or SI 2, or may be some parameters of an SI message. Likewise, the SIB container may be a complete SIB message, such as a SIB 1 and a SIB 2, or may be some parameters of a SIB message. Optionally, an example of an F1 interface message format is as follows:

SI list (system information list)
>SI type (system information type)
>SI container (system information container)
>IE list
>>IE i
>>Corresponding IE identifier in SI IE i is an IE identifier of the IE in the SI container. A corresponding IE identifier in SI is an IE identifier in SI specified by the SI type. For example, if the SI type indicates the SI 1, "the corresponding IE identifier in the SI" corresponds to "an IE identifier in the SI 1". When a correspondence between an IE identifier in the SI container and an actual IE identifier in SI is specified by a protocol, the F1 interface message format is as follows:

SI list (system information list)
>SI type (system information type)
>SI container (system information container)

Another possible F1 interface message format is as follows:

SIB list
>SIB type
>SIB container
>IE list
>>IE i
>>Corresponding IE identifier in a SIB IE i is an IE identifier of the IE in the SIB container. A corresponding IE identifier in a SIB is an IE identifier in a SIB specified by the SIB type. For example, if the SIB type indicates the SIB 1, "the corresponding IE identifier in the SIB" corresponds to "an IE identifier in the SIB 1". Likewise, when a correspondence between an IE identifier in the SIB container and an actual IE identifier in a SIB is specified by a protocol, the F1 interface message format is as follows:

```
SIB list
>SIB type
>SIB container
```

The SI container or the SIB container is corresponding SI or a corresponding SIB that has been encoded by ASN.1. For the case of the SI container, SIBs specifically included in each piece of SI may be predefined. Likewise, which IEs are provided in each SIB and who provides these IEs may also be predefined. Alternatively, a correspondence between an IE in the SI or SIB container and an IE in actual SI/an actual SIB is provided by the CU. For example, IEs numbered 2, 4, and 6 in the SI 1 numbered 1 are provided by the CU, and IEs 1, 8, and 10 in the SI 2 are provided by the CU. In this case, the IEs 1, 2, and 3 in an SI 1 container that are provided by the CU respectively correspond to the IEs 2, 4, and 6 in actual SI 1 of a final version encoded by the DU. The IEs 1, 2, and 3 in an SI 2 container that are provided by the CU respectively correspond to the IEs 1, 8, and 10 in actual SI 2 of a final version encoded by the DU. For the case of the SIB container, a correspondence between an IE that is in a SIB and that is provided by the CU and an IE in an actual SIB of a final version encoded by the DU may be specified by a protocol, or may be provided by the CU. For example, the IEs 1, 2, and 3 in the SIB 1 that are provided by the CU respectively correspond to the IEs 4, 7, and 12 in an actual SIB 1 of a final version encoded by the DU.

In another possible implementation, SI or SIBs are provided by the CU. For example, there are a total of four SI blocks, SI 1 and SI 2 are provided by the CU, and SI 3 and SI 4 are provided by the DU; or SIBs 1 to 15 are provided by the DU, and SIBs 16 to 23 are provided by the CU. In this case, the CU may further provide an area ID corresponding to a SIB to the DU, so that the DU adds the area ID to final system information. For example, an F1 interface message format is as follows:

```
SIB list
>SIB type
>SIB container
>area ID
```

Optionally, the foregoing method is also applicable to a case in which the CU encodes the final system information and the DU provides parameters of the system information. For example, the DU sends the SIParaContainer to the CU, and actual internal encoding is sorted based on sizes of SIB identifiers and/or a sequence of IEs in SIBs. Alternatively, the DU sends the SIParaContainer to the CU. In addition, a correspondence between an IE in the SIParaContainer, an actual SI/SIB identifier, and an IE in SI/a SIB needs to be indicated on an F1-C interface. Alternatively, the DU sends an SI type+SI container or a SIB type+SIB container to the CU, and a correspondence between an IE in the SI/SIB container and an IE in actual SI/an actual SIB may also be included.

Optional Specific Example 2

For UE in an active state, other SI may be requested by using dedicated RRC signaling. To be specific, the UE in an active state (UE in an active state) requests on demand SI (on-demand system information) by using an RRC message, and the CU needs to reply by using an RRC message, that is, the CU needs to have corresponding system information.

In a possible implementation, optionally, after encoding all SI or SIBs, the DU sends all the SI or all the other SI to the CU. The SI may be provided in a form of an SI block. In this case, a corresponding SI type indication needs to be provided. The SI may alternatively be provided in a form of a SIB. In this case, a corresponding SIB type indication needs to be provided. When the UE requests an SI block or a SIB by using an RRC message, the CU may find corresponding SI/a corresponding SIB based on the SI type indication or the SIB type indication, and send the SI/SIB to the UE by using an RRC message, and specifically, by using an F1 control plane message such as a UL SI transfer message (uplink system information transfer message). Optionally, a format of the message may be shown as follows:

```
SI list
>SI type
>>SI container
```

Alternatively, an example of a message format is as follows:

```
SIB list
>SIB type
>>SIB container
```

The SI container or the SIB container includes a complete SI message or SIB message that is encoded by the DU.

In another possible manner, the DU sends encoded final system information to the CU in a form of a SIB, and notifies the CU of a mapping relationship between a SIB and SI. When the UE requests SI by using an RRC message, the CU may find, based on the mapping relationship between a SIB and SI, a SIB included in the corresponding SI, and send the SIB to the UE by using an RRC message. For example, the message sent by the DU to the CU has the following format:

```
SI list
>SI type
>>SIB type
>>>SIB container
```

The SI type and the SIB type may be the mapping relationship between a SIB and SI. For example, SI 1 includes a SIB 2, a SIB 3, and a SIB 4. Certainly, the mapping relationship between a SIB and SI may alternatively be provided in another manner. When the UE requests the SI 1 by using an RRC message, the CU finds, based on the mapping relationship between a SIB and SI, the SIB 2, the SIB 3, and the SIB 4, and sends the SIB 2, the SIB 3, and the SIB 4 to the UE by using an RRC message.

Optionally, in this case, if the DU has an update of the system information, the DU may actively send updated system information such as other SI to the CU. Specifically, the DU may send updated SI/an updated SIB to the CU, or may send all SI/SIBs to the CU. The SI may be provided in a form of an SI block. In this case, a corresponding SI type indication needs to be provided. The SI may alternatively be provided in a form of a SIB. In this case, a corresponding SIB type indication needs to be provided. The CU finds corresponding SI/a corresponding SIB based on the SI/SIB type indication, and replaces SI/a SIB stored by the CU with the SI/SIB sent by the DU. In this way, the CU always stores latest system information. Once the UE requests other SI by using an RRC message, the CU may reply at the first time by using an RRC message. In another possible manner, the CU receives an RRC message for requesting the other SI, but cannot determine whether the other SI stored by the CU is of a latest version. The CU sends, to the DU, a request for other SI, and the request includes the SI type indication/the SIB type indication. Then the DU sends requested SI/SIB to the CU, and the CU may add the SI/SIB to an RRC message, to reply to the UE.

Optional Specific Example 3

The CU instructs the DU to broadcast other SI, specifically including an SI type indication or a SIB type indication.

When UE (for example, UE in an idle state (UE in an idle state) or UE in an inactive state (UE in an inactive state)) requests other SI by using a msg 3 (a third message in an initial access process or an RRC connection process, for example, an RRC connection request message), because the msg 3 also requests other SI by using an RRC message, the DU cannot parse the RRC message. The DU forwards the RRC message to the CU, that is, the CU receives the RRC message for requesting the other SI. If the CU determines to reply through broadcast, or it is specified by a protocol that the UE requests the other SI by using the msg 3, the other SI may be sent through broadcast. In this case, the CU needs to notify the DU of SI or a SIB to be broadcast.

In a possible manner, specifically, the other SI may be indicated by using a system information-related message sent by the CU to the DU. For example, the other SI may be indicated by using a DL SI transfer (downlink system information transfer) message or a broadcast SI indication (broadcast system information indication) message. For example, a message format is as follows:

Requested/broadcast SI list (requested/broadcast system information list)
>SI type Alternatively, a message format is as follows:

Requested/broadcast SIB list (requested/broadcast system information block list)
>SIB type Optional Specific Example 4

In a dual connectivity (dual Connectivity, DC) scenario, system information of a secondary base station needs to be sent to UE by using dedicated RRC signaling of a primary base station.

In this scenario, the following optional steps may be included:

Step 1: A secondary base station CU sends an SI message/a SIB message or some parameters of SI/a SIB to a secondary base station DU. A specific method may be the same as corresponding content in specific example 1, and details are not described herein again.

Step 2: The secondary base station DU encodes final system information SI/SIB, sends encoded SI/SIB to the secondary base station CU, and indicates a corresponding SI type or SIB type. A specific method may be the same as a corresponding part in specific example 2, and details are not described herein again.

Step 3: The secondary base station CU sends the SI type or the SIB type and the corresponding SI or SIB to a primary base station MgNB or a primary base station CU through an interface between the primary base station and the secondary base station.

Step 4: The primary base station MgNB or the primary base station CU sends the SI/SIB to the UE by using an RRC message. Particularly, the SI type or the SIB type may also be included.

It should be noted that the method may include one or more of the foregoing steps, and this is not limited in the present invention. In addition, it should be noted that a sequence of these steps is not limited.

Optionally, in a carrier aggregation (Carrier aggregation, CA) scenario, system information of a secondary carrier needs to be sent to the UE by using dedicated RRC signaling of a primary carrier. Different from the DC scenario, the secondary carrier and the primary carrier are co-site carriers. Therefore, step 3 may be omitted, and in the other steps, the secondary base station is replaced with the secondary carrier, and the primary base station is replaced with the primary carrier.

Optional Specific Example 5

The CU provides a correspondence between a preamble (preamble) and SI/a SIB, and notifies the DU of the correspondence.

For example, UE sends a preamble 1 to indicate an application for SI 1, sends a preamble 2 to indicate an application for SI 2, and so on; or sends a preamble 1 to indicate an application for a SIB 1, sends a preamble 2 to indicate an application for a SIB 2, and so on. Subsequently, after receiving the preamble from the UE, the DU broadcasts, based on a correspondence that is between a preamble and SI/a SIB and that is provided by the CU, SI/a SIB corresponding to the preamble. Certainly, the relationship between SI/a SIB and a preamble may be determined by the DU.

Optional specific example 6

UE requests system information by using msg 1 (the first message in an initial access process or an RRC connection process, for example, a preamble sending message).

In this case, if the system information is pre-stored in the DU, interaction between the CU and the DU is avoided. However, if the system information is not pre-stored in the DU, the DU needs to send a type of the requested system information to the CU, the CU generates the corresponding system information and sends the corresponding system information to the DU, and the DU encodes the system information and sends encoded system information to the UE. The following optional steps may be included.

Step 1: After receiving the msg 1, the DU sends, to the CU, a type of SI/a SIB that needs to be generated by the CU.

Step 2: After generating some SI/SIBs, the CU sends the generated SI/SIBs to the DU.

Step 3: The DU encodes some system information generated by the DU and some system information sent by the CU, and sends encoded system information to the UE.

It should be noted that the method may include one or more of the foregoing steps, and this is not limited in the present invention. In addition, it should be noted that a sequence of these steps is not limited.

According to this embodiment of the present invention, it is assumed that the CU encodes all SI, and some system information or some parameters of system information are provided by the DU. Optionally, for example, through preconfiguration by an OAM system, related parameters of SI generated on a DU side, for example, complete SI/SIBs or parameters in SI/SIBs, are preconfigured to the CU. For another example, when the SI/SIBs or the parameters in the SI/SIBs on the DU side are changed subsequently, the DU provides updated SI/SIBs or updated parameters in the SI/SIBs. In other words, all SI is pre-stored in the CU.

Optional Specific Example 7

In a possible implementation, the following step is included:

Step 1: The DU provides some system information or some parameters of system information to the CU, and the CU encodes final system information. For details, refer to a corresponding part in specific example 1. A difference lies in that roles of the CU and the DU are interchangeable.

Optionally, the method may further include the following step: After encoding the final system information, the CU sends the system information to the DU through an F1 interface control plane, and an SI type indication or a SIB type indication may also be carried. In addition, a correspondence between a preamble and SI or a SIB may also be included. For example, sending a preamble 1 to indicate an application for SI 1, sending a preamble 2 to indicate an applying for SI 2, and so on, or sending a preamble 1 to indicate an application for a SIB 1, sending a preamble 2 to indicate an application for a SIB 2, and so on. When the UE requests other SI by using msg 1, the DU may find corresponding SI/a corresponding SIB based on the correspondence between a preamble and SI or a SIB (the correspondence may be alternatively specified by a protocol), modify a bitmap corresponding to the SI/SIB, and broadcast modified bitmap together with the SI/SIB. Each bit in the bitmap corresponds to one piece of SI or one SIB. When a bit value is 1, it indicates that the broadcast includes the corresponding SI or SIB; and when a bit value is 0, it indicates that the broadcast does not include the corresponding SI or SIB. Alternatively, the DU notifies the CU of SI/a SIB to be broadcast (indicated by using the SI/SIB type), the CU updates a corresponding bitmap, the CU transmits the bitmap to the DU, and the DU broadcasts the bitmap and the requested SI/SIB. Alternatively, the CU sends the bitmap together with the requested SI/SIB to the DU, and the DU broadcasts the bitmap and the requested SI/SIB.

When the UE requests other SI by using msg 3, the CU may update a corresponding bitmap (bitmap), send the bitmap to the DU, and indicate, to the DU, SI/a SIB to be broadcast (indicated by using the SI/SIB type); or the CU sends the bitmap together with the requested SI/SIB to the DU, and the DU broadcasts.

Optionally, in a DC scenario, system information of a secondary base station needs to be sent to UE by using dedicated RRC signaling of a primary base station. In this scenario, the following optional steps may be included:

Step 1: A secondary base station DU sends an SI message/a SIB message or some parameters of SI/a SIB to a secondary base station CU, where a corresponding SI type or SIB type may be included.

Step 2: The secondary base station CU encodes final system information SI/SIB.

Step 3: The secondary base station CU sends the SI type or the SIB type and the corresponding SI or SIB to a primary base station MgNB or a primary base station CU through an interface between the primary base station and the secondary base station.

Step 4: The primary base station MgNB or the primary base station CU sends the SI/SIB to the UE by using an RRC message. Particularly, the SI type or the SIB type may also be included.

It should be noted that the method may include one or more of the foregoing steps, and this is not limited in the present invention. In addition, it should be noted that a sequence of these steps is not limited.

In a carrier aggregation (Carrier aggregation, CA) scenario, system information of a secondary carrier needs to be sent to the UE by using dedicated RRC signaling of a primary carrier. Different from the DC scenario, the secondary carrier and the primary carrier are co-site carriers. Therefore, step 3 may be omitted, and in the other steps, the secondary base station may be replaced with the secondary carrier, and the primary base station may be replaced with the primary carrier.

According to this embodiment of the present invention, it is assumed that some system information is generated and encoded in the CU, and some system information is generated and encoded in the DU. In this case, the system information is transmitted on a CU/DU interface in a form of a container. In other words, the CU or the DU each can encode only the system information generated by the CU or the DU, and directly send the system information generated by the other party without performing any processing.

Optionally, in an idle or inactive mode, the MSG 1 or the MSG 3 may be used to request system information.

Optional Specific Example 8

System information is requested by using msg 1.

UE sends the msg 1 to the DU. After receiving the msg 1, the DU needs to send indication information of a SIB type to the CU, and instructs the CU to send SI of the SIB type to the DU. Herein, the indication information of the SIB type needs to be added to the CU/DU, and is sent by the DU to the CU. The method may include one or more of the following steps, and this is not limited in the present invention. It should be noted that a sequence of these steps is not limited. In this scenario, the following steps are included:

Step 1: The UE sends the msg 1 to the DU and requests corresponding on demand SI.

Step 2: After receiving the msg 1, the DU sends a system information request to the CU, where a SIB type of SI requested to be generated by the CU is carried.

Step 3: After receiving the request, the CU sends, to the DU, corresponding system information generated and encoded by the CU.

Step 4: The DU sends, to the UE, the generated and encoded system information sent by the CU.

Optional Specific Example 9

When system information is requested by using msg 3, one or more of the following steps may be included, and this is not limited in the present invention. It should be particularly noted that a sequence of these steps is not limited. In this scenario, the following steps are included:

Step 1: UE sends an RRC request to the DU, to request required system information.

Step 2: The DU forwards the request message to the CU.

Step 3: The CU sends an SI type indication to the DU, and instructs the DU to generate and encode corresponding SI.

Step 4: After generating the requested system information, the DU sends, to the CU, the corresponding system information encoded by the DU.

Step 5: The CU sends, to the UE, system information generated and encoded by the CU and the system information generated and encoded by the DU.

Optional Specific Example 10

UE in an active mode needs to request other SI by using a dedicated RRC message. In this case, after the RRC message is sent to the CU via the DU, the CU needs to send indication information to the DU, to indicate, to the DU, an SI type that needs to be generated and sent to the UE. After generating the requested system information, the DU further needs to send corresponding system information to the CU. Finally, the CU sends the two parts of system information to the UE.

Optional Specific Example 11

In an LTE-NR DC scenario, LTE is used as an MeNB, and system information is sent to UE by using dedicated RRC signaling. In this scenario, the DU needs to send some of generated SI to the CU, and the CU generates complete SI and sends the complete SI to the UE. The DU needs to send, to the CU, a SIB type and content of the system information that is generated by the DU.

In an SI update scenario, system information update may be triggered by the CU or the DU. In LTE, system information is updated in two manners: paging (paging) and a systemInfoValueTag (a system information value tag) field in an SIB 1. Optionally, for update of the system information generated by the DU, if the paging manner is triggered by the CU, the DU needs to notify the CU of a type of updated system information and specific content of the updated system information; or if the paging is triggered by the DU, the CU needs to notify the DU of a type of updated system information and content of the updated system information.

Optionally, for the systemInfoValueTag field in the SIB 1, if an update field is generated by the CU, the DU needs to notify the CU of a type of system information updated by the DU and specific updated content; or if an update field is generated by the DU, the CU needs to send updated system information and a type of the system information to the DU.

Optionally, in a CA scenario, SI information in an SCC is obtained. When the system information is updated, the DU needs to notify the CU that the SI is updated, and sends corresponding updated system information to the CU. Then the CU broadcasts the updated system information.

The information transmission methods in the embodiments of this application are described above in detail with reference to FIG. 3 to FIG. 7, and network devices in the embodiments of this application are described below in detail with reference to FIG. 8 to FIG. 15.

Figure 8:
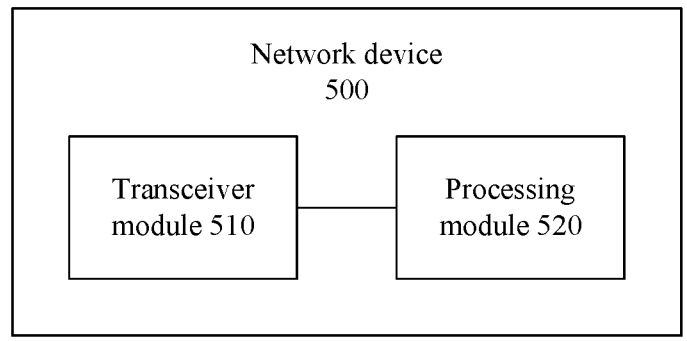
FIG. 8 is a schematic block diagram of a network device for information transmission according to an embodiment of this application.

FIG. 8 is a schematic block diagram of a network device 500 for information transmission according to an embodiment of this application. As shown in FIG. 8, the network device 500 includes:

a transceiver module 510, configured to receive a first paging message sent by a second network node, where the first paging message includes first configuration information corresponding to a terminal device, the first paging message is sent by the second network node based on a second paging message that is sent by a core network node and that is used for paging the terminal device, and the second paging message includes the first configuration information; and a processing module 520, configured to determine, by the first network node, a first paging configuration parameter based on the first configuration information and second configuration information, where the second configuration information is configuration information of a cell served by the first network node, where the transceiver module 510 is further configured to send a third paging message based on the first paging message and the first paging configuration parameter under the control of the processing module 520, where the third paging message is used for paging the terminal device.

Optionally, the first paging configuration parameter includes a paging range and a paging occasion.

Optionally, the first paging configuration parameter is a paging occasion, the first paging message further includes a second paging configuration parameter, and the second paging configuration parameter is a paging range; or the first paging configuration parameter is a paging range, the first paging message further includes a second paging configuration parameter, and the second paging configuration parameter is a paging occasion.

Optionally, the transceiver module 510 is further configured to send the second configuration information to the second network node, so that the second network node determines the second paging configuration parameter.

Optionally, the transceiver module 510 is further configured to receive request information sent by the second network node, where the request information is used by the second network node to request the second configuration information from the first network node.

Optionally, the first configuration information includes at least one of identification information of the terminal device, paging area information of the terminal device, a paging cycle of the terminal device, and a paging density, and the second configuration information includes at least one of identification information of the cell, a paging cycle of the cell, and a paging density.

The processing module 520 is specifically configured to determine the paging range and the paging occasion based on the identification information of the terminal device, the paging area information of the terminal device, the paging cycle of the terminal device, the paging density, the identification information of the cell, and the paging cycle of the cell.

Optionally, the first configuration information includes at least one of identification information of the terminal device, paging area information of the terminal device, a paging cycle of the terminal device, and a paging density, and the second configuration information includes at least one of identification information of the cell, a paging cycle of the cell, and a paging density.

The processing module 520 is specifically configured to determine the paging range or the paging occasion based on the identification information of the terminal device, the paging area information of the terminal device, the paging cycle of the terminal device, the paging density, the identification information of the cell, and the paging cycle of the cell.

Optionally, the paging range includes the identification information of the cell; and/or the paging occasion includes information about a first subframe, and the information about the first subframe is used by the terminal device to determine to receive the third paging message in the first subframe.

According to the network device for information transmission in this embodiment of this application, computation of the paging configuration parameter is deployed in the first network node, so that a current system frame number can be obtained, and the paging range and the paging occasion can be computed in real time. In addition, a latency from the second network node to the first network node can be prevented from affecting accuracy in receiving a paging frame and the paging occasion by the terminal device.

Figure 9:
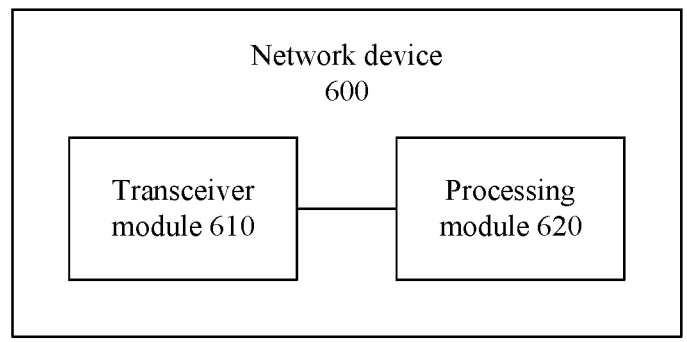
FIG. 9 is another schematic block diagram of a network device for information transmission according to an embodiment of this application.

FIG. 9 is a schematic block diagram of a network device 600 for information transmission according to an embodiment of this application. As shown in FIG. 9, the network device 600 includes:

a transceiver module 610, configured to receive a second paging message sent by a core network node, where the second paging message is used to page a terminal device, and the second paging message includes first configuration information corresponding to the terminal device, where the transceiver module 610 is further configured to receive second configuration information sent by a first network node, where the second configuration information is configuration information of a cell served by the first network node; and a processing module 620, configured to determine a third paging configuration parameter based on the first configuration information and the second configuration information.

The transceiver module 610 is further configured to send a first paging message to the first network node based on the second paging message and the third paging configuration parameter under the control of the processing module, so that the first network node pages the terminal device.

Optionally, the transceiver module 610 is further configured to send request information to the first network node, where the request information is used to request the second configuration information from the first network node.

Optionally, the third paging configuration parameter is a paging range and/or a paging occasion.

Optionally, the first configuration information includes at least one of identification information of the terminal device, paging area information of the terminal device, a paging cycle of the terminal device, and a paging density, and the second configuration information includes at least one of identification information of the cell, a paging cycle of the cell, and a paging density.

The processing module 620 is specifically configured to determine the paging range and/or the paging occasion based on the identification information of the terminal device, the paging area information of the terminal device, the paging cycle of the terminal device, the paging density, the identification information of the cell, and the paging cycle of the cell.

Optionally, the paging range includes the identification information of the cell; and/or the paging occasion includes information about a first subframe, and the information about the first subframe is used by the terminal device to determine to receive the third paging message in the first subframe.

According to the network device for information transmission in this embodiment of this application, a manner of sending the paging message can be optimized when some functions of a network device are distributed to different network nodes.

Figure 10:
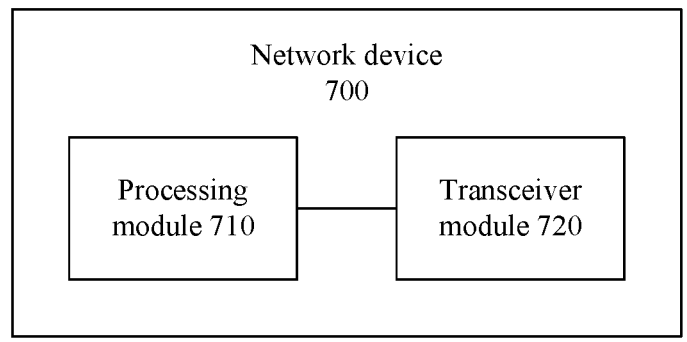
FIG. 10 is still another schematic block diagram of a network device for information transmission according to an embodiment of this application.

FIG. 10 is a schematic block diagram of a network device 700 according to an embodiment of this application. As shown in FIG. 10, the network device 700 includes:

a processing module 710, configured to generate first system information; and a transceiver module 720, configured to send the first system information to a terminal device.

The processing module and the transceiver module are modules in a data unit in a cloud radio access network or a super cell.

Optionally, the transceiver module 720 is further configured to send the first system information to a second network node, where the second network node is a control node in the cloud radio access network or the super cell.

Optionally, the first system information is changed.

The processing module 710 is further configured to generate changed system information.

The transceiver module 720 is further configured to send the changed system information to the terminal device.

Optionally, the transceiver module 720 is further configured to send the changed system information to the second network node.

According to the network device for information transmission in this embodiment of this application, generation of the system information is deployed in the first network node, so that a current system frame number and an information element that is required for generating the system information can be obtained in time, an algorithm procedure that affects the system information and the system information can be controlled to take effect simultaneously, and some modules can be prevented from taking effect first. In addition, the following problem can be avoided: The current system frame number and a latency from the second network node to the first network node cannot be obtained in an eDRX scenario, affecting computation of the system information and generation of the frame number.

Figure 11:
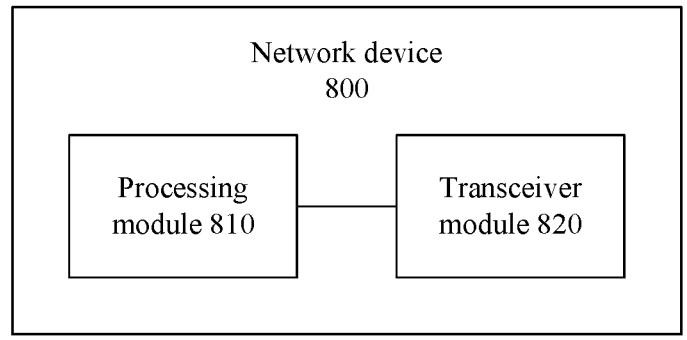
FIG. 11 is still another schematic block diagram of a network device for information transmission according to an embodiment of this application.

FIG. 11 is a schematic block diagram of a network device 800 according to an embodiment of this application. As shown in FIG. 11, the network device 800 includes:

a processing module 810, configured to generate first system information; and a transceiver module 820, configured to send the first system information to a first network node.

The first network node is a data unit in a cloud radio access network or a super cell, and the processing module and the transceiver module are modules in a control node in the cloud radio access network or the super cell.

Optionally, the first system information is changed.

The transceiver module 820 is further configured to receive changed system information sent by the first network node, where the changed system information is generated by the first network node.

The processing module 810 is further configured to generate second system information based on the changed system information.

The transceiver module 820 is further configured to send the second system information to the first network node.

According to the network device for information transmission in this embodiment of this application, a manner of sending the system information can be optimized when some functions of a network device are distributed to different network nodes.

Figure 12:
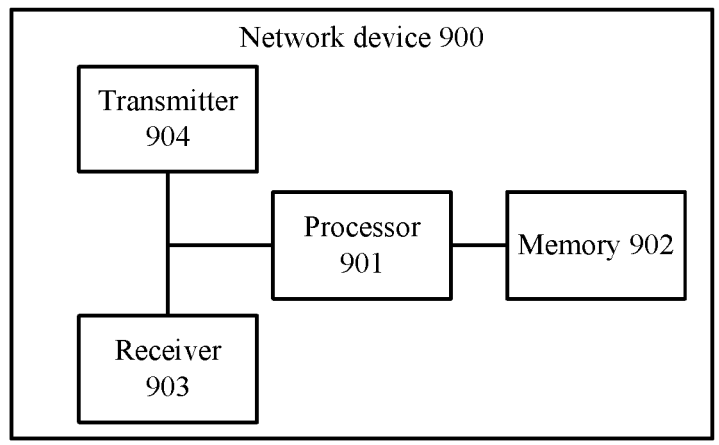
FIG. 12 is still another schematic block diagram of a network device for information transmission according to an embodiment of this application.

FIG. 12 is a schematic structural diagram of a network device 900 according to an embodiment of this application. As shown in FIG. 12, the network device 900 includes a processor 901, a memory 902, a receiver 903, and a transmitter 904. These components are communicatively connected to each other. The memory 902 is configured to store an instruction, and the processor 901 is configured to execute the instruction stored in the memory 902, and control the receiver 903 to receive information and control the transmitter 904 to send information.

The processor 901 is configured to execute the instruction stored in the memory 902, and the processor 901 may be configured to perform the operations and/or functions corresponding to the processing module 520 in the network device 500. The receiver 903 and the transmitter 904 may be configured to perform the operations and/or functions corresponding to the transceiver module 510 in the network device 500. For brevity, details are not described herein again.

Figure 13:
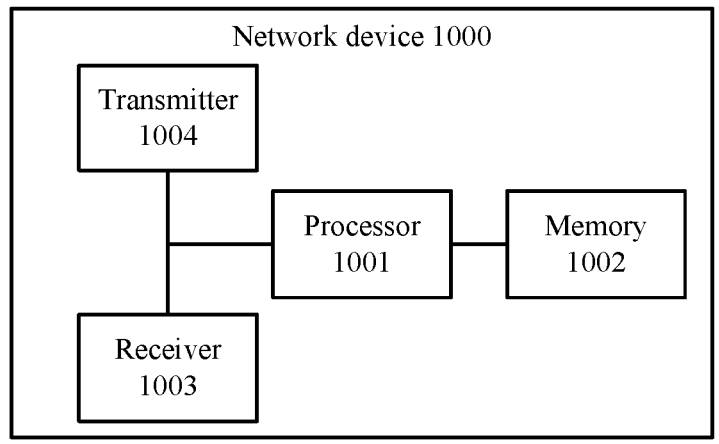
FIG. 13 is still another schematic block diagram of a network device for information transmission according to an embodiment of this application.

FIG. 13 is a schematic structural diagram of a network device 1000 according to an embodiment of this application. As shown in FIG. 13, the network device 1000 includes a processor 1001, a memory 1002, a receiver 1003, and a transmitter 1004. These components are communicatively connected to each other. The memory 1002 is configured to store an instruction, and the processor 1001 is configured to execute the instruction stored in the memory 1002, and control the receiver 1003 to receive information and control the transmitter 1004 to send information.

The processor 1001 is configured to execute the instruction stored in the memory 1002, and the processor 1001 may be configured to perform the operations and/or functions corresponding to the processing module 620 in the network device 600. The receiver 1003 and the transmitter 1004 may be configured to perform the operations and/or functions corresponding to the transceiver module 610 in the network device 600. For brevity, details are not described herein again.

Figure 14:
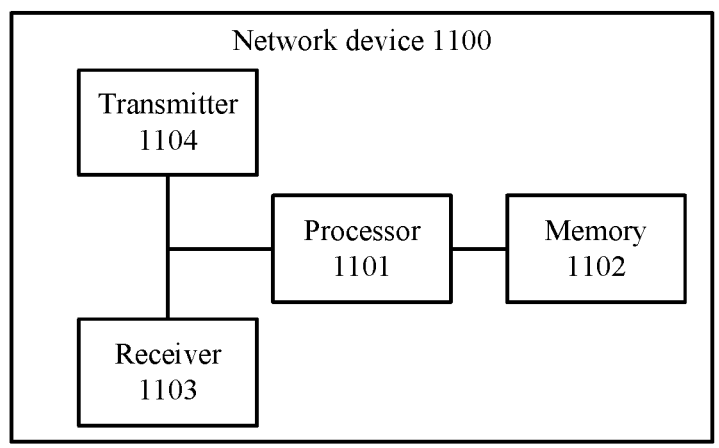
FIG. 14 is a still another schematic block diagram of a network device for information transmission according to an embodiment of this application.

FIG. 14 is a schematic structural diagram of a network device 1100 according to an embodiment of this application. As shown in FIG. 14, the network device 1100 includes a processor 1101, a memory 1102, a receiver 1103, and a transmitter 1104. These components are communicatively connected to each other. The memory 1102 is configured to store an instruction, and the processor 1101 is configured to execute the instruction stored in the memory 1102, and control the receiver 1103 to receive information and control the transmitter 1104 to send information.

The processor 1101 is configured to execute the instruction stored in the memory 1102, and the processor 1101 may be configured to perform the operations and/or functions corresponding to the processing module 710 in the network device 700. The receiver 1103 and the transmitter 1104 may be configured to perform the operations and/or functions corresponding to the transceiver module 720 in the network device 700. For brevity, details are not described herein again.

Figure 15:
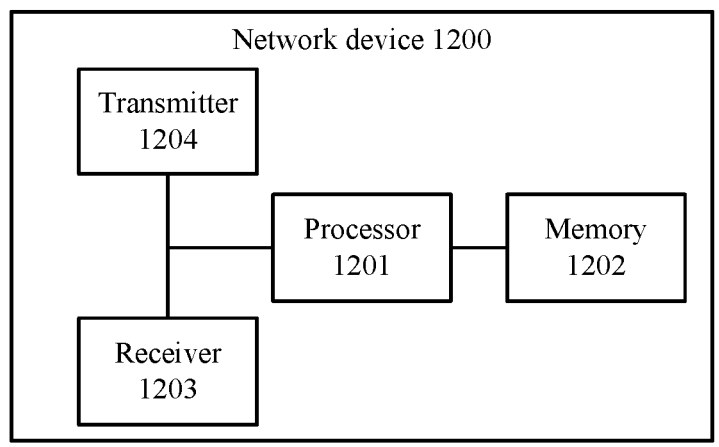
FIG. 15 is a still another schematic block diagram of a network device for information transmission according to an embodiment of this application.

FIG. 15 is a schematic structural diagram of a network device 1200 according to an embodiment of this application. As shown in FIG. 15, the network device 1200 includes a processor 1201, a memory 1202, a receiver 1203, and a transmitter 1204. These components are communicatively connected to each other. The memory 1202 is configured to store an instruction, and the processor 1201 is configured to execute the instruction stored in the memory 1202, and control the receiver 1203 to receive information and control the transmitter 1204 to send information.

The processor 1201 is configured to execute the instruction stored in the memory 1202, and the processor 1201 may be configured to perform the operations and/or functions corresponding to the processing module 810 in the network device 800. The receiver 1203 and the transmitter 1204 may be configured to perform the operations and/or functions corresponding to the transceiver module 820 in the network device 800. For brevity, details are not described herein again.

An embodiment of this application further provides a system chip. The system chip includes an input/output interface, at least one processor, at least one memory, and a bus. The at least one memory is configured to store an instruction, and the at least one processor is configured to invoke the instruction in the at least one memory, to perform the operations in the methods in the foregoing embodiments.

In the embodiments of this application, the processor may be a central processing unit (Central Processing Unit, CPU), a network processor (Network Processor, NP), or a combination of a CPU and an NP. The processor may further include a hardware chip. The hardware chip may be an application-specific integrated circuit (Application-Specific Integrated Circuit, ASIC), a programmable logic device (Programmable Logic Device, PLD), or a combination thereof. The PLD may be a complex programmable logic device (Complex Programmable Logic Device, CPLD), a field-programmable gate array (Field-Programmable Gate Array, FPGA), a generic array logic (Generic Array Logic, GAL), or a combination thereof.

The memory may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM) and is used as an external cache.

All or some of the foregoing embodiments may be implemented through software, hardware, firmware, or any combination thereof. When software is used to implement the embodiments, the embodiments may be implemented completely or partially in a form of a computer program product. The computer program product may include one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid state drive (SSD)), or the like.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps in the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An information transmission method, comprising:
receiving, by a second network node, a second paging message from a core network node, wherein the second paging message is used for paging a terminal device;
in response to receiving the second paging message from the core network node, sending, by the second network node, a first paging message to a first network node, wherein the first paging message comprises first configuration information corresponding to the terminal device, and wherein the first configuration information comprises identification information of the terminal device and a paging cycle of the terminal device;
determining, by the first network node, a first paging configuration parameter based on the first configuration information received from the second network node and second configuration information, wherein the second configuration information is configuration information of a cell served by the first network node, and wherein the first paging configuration parameter comprises paging occasion (PO); and
sending, by the first network node, a third paging message based on the first paging message and the first paging configuration parameter, and the first paging configuration parameter is determined by the first network node, wherein the third paging message is used for paging the terminal device.

2. The method according to claim 1, wherein the first paging configuration parameter comprises a paging frame (PF) and a PO.

3. The method according to claim 1, wherein the second configuration information comprises a paging cycle of the cell.

4. The method according to claim 1, wherein the first paging message comprises a second paging configuration parameter, wherein the second paging configuration parameter is paging range, and wherein the paging range comprises identification information of the cell corresponding to the terminal device.

5. The method according to claim 4, wherein before the second network node sends the second paging configuration parameter to the first network node, the method further comprises:
sending, by the first network node, the second configuration information to the second network node; and
determining, by the second network node, the second paging configuration parameter, wherein the second configuration information comprises the identification information of the cell corresponding to the terminal device.

6. The method according to claim 1, wherein the second paging message comprises the first configuration information.

7. The method according to claim 1, wherein:
the first network node comprises function of radio link control (RLC) layer, function of media access control (MAC) layer, and function of PHY layer, and the second network node comprises function of radio resource control (RRC) layer and function of packet data convergence protocol (PDCP) layer; or
the first network node comprises function of RLC layer, function of MAC layer, and function of PHY layer, and the second network node comprises function of RRC layer and function of PDCP layer, wherein the first network node and the second network node belong to a single base station.

8. A communication system for information transmission, comprising:
a first network node; and
a second network node, wherein:
the second network node is configured to:
receive a second paging message from a core network node, wherein the second paging message is used for paging a terminal device; and in response to receiving the second paging message from the core network node, send a first paging message to the first network node, wherein the first paging message comprises first configuration information corresponding to the terminal device, and wherein the first configuration information comprises identification information of the terminal device and a paging cycle of the terminal device; and the first network node is configured to:
determine a first paging configuration parameter based on the first configuration information received from the second network node and second configuration information, wherein the second configuration information is configuration information of a cell served by the first network node, and wherein the first paging configuration parameter comprises paging occasion (PO); and
send a third paging message based on the first paging message and the first paging configuration parameter, and the first paging configuration parameter is determined by the first network node, wherein the third paging message is used for paging the terminal device.

9. The communication system according to claim 8, wherein the first paging configuration parameter comprises a paging frame (PF) and a PO.

10. The communication system according to claim 8, wherein the second configuration information comprises a paging cycle of the cell.

11. The communication system according to claim 8, wherein the first paging message comprises a second paging configuration parameter, wherein the second paging configuration parameter is paging range, and wherein the paging range comprises identification information of the cell corresponding to the terminal device.

12. The communication system according to claim 11, wherein before the second network node sends the second paging configuration parameter to the first network node, the first network node is configured to send the second configuration information to the second network node, and the second network node is configured to determine the second paging configuration parameter, wherein the second configuration information comprises the identification information of the cell corresponding to the terminal device.

13. The communication system according to claim 8, wherein the second paging message comprises the first configuration information.

14. The communication system according to claim 8, wherein:
the first network node comprises function of radio link control (RLC) layer, function of media access control (MAC) layer, and function of PHY layer, and the second network node comprises function of radio resource control (RRC) layer and function of packet data convergence protocol (PDCP) layer; or
the first network node comprises function of RLC layer, function of MAC layer, and function of PHY layer, and the second network node comprises function of RRC layer and function of PDCP layer, wherein the first network node and the second network node belong to a single base station.

15. An apparatus applied for a network node, comprising:
a transceiver, the transceiver configured to receive a first paging message from a second network node, wherein the first paging message is sent by the second network node in response to the second network node receiving a second paging message from a core network node, wherein the second paging message is used for paging a terminal device, wherein the first paging message comprises first configuration information corresponding to the terminal device, and wherein the first configuration information comprises identification information of the terminal device and a paging cycle of the terminal device;
at least one processor; and
one or more memories coupled to the at least one processor and storing programming instructions for execution by the at least one processor to determine a first paging configuration parameter based on the first configuration information received from the second network node and second configuration information, wherein the second configuration information is configuration information of a cell served by a first network node, wherein the first paging configuration parameter comprises paging occasion (PO); and
the transceiver is further configured to send a third paging message based on the first paging message and the first paging configuration parameter, and the first paging configuration parameter is determined by the first network node, wherein the third paging message is used for paging the terminal device.

16. The apparatus according to claim 15, wherein the first paging configuration parameter comprises a paging frame (PF) and a PO.

17. The apparatus according to claim 15, wherein the second configuration information comprises a paging cycle of the cell.

18. The apparatus according to claim 15, wherein the first paging message comprises a second paging configuration parameter, wherein the second paging configuration parameter is paging range, and wherein the paging range comprises identification information of the cell corresponding to the terminal device.

19. The apparatus according to claim 18, wherein the transceiver is further configured to, before the apparatus receives the second paging configuration parameter from the second network node, send the second configuration information to the first network node, wherein the second network node determines the second paging configuration parameter, and wherein the second configuration information comprises the identification information of the cell corresponding to the terminal device.

20. The apparatus according to claim 15, wherein the second paging message comprises the first configuration information.

21. The apparatus according to claim 15, wherein:
the apparatus is configured to have function of radio link control (RLC) layer, function of media access control (MAC) layer, and function of PHY layer, and the second network node is configured to have function of radio resource control (RRC) layer and function of packet data convergence protocol (PDCP) layer; or
the apparatus is configured to have function of RLC layer, function of MAC layer, and function of PHY layer, and the second network node is configured to have function of RRC layer and function of PDCP layer, wherein the first network node and the second network node belong to a single base station.

22. An apparatus applied for a network node, comprising:
at least one processor; and
a transceiver, the transceiver configured to:
receive a second paging message from a core network node, wherein the second paging message is used for paging a terminal device; and
in response to receiving the second paging message from the core network node, send a first paging message to a first network node, wherein the first paging message comprises first configuration information corresponding to the terminal device, and wherein the first configuration information comprises identification information of the terminal device and a paging cycle of the terminal device to support the first network node to:
determine a first paging configuration parameter based on the first configuration information received from a second network node and second configuration information, wherein the second configuration information is configuration information of a cell served by the first network node, and wherein the first paging configuration parameter comprises paging occasion (PO); and
send a third paging message based on the first paging message and the first paging configuration parameter, and the first paging configuration parameter is determined by the first network node, wherein the third paging message is used for paging the terminal device.

23. The apparatus according to claim 22, wherein the first paging configuration parameter comprises a paging frame (PF) and a PO.

24. The apparatus according to claim 22, wherein the second configuration information comprises a paging cycle of the cell.

25. The apparatus according to claim 22, wherein the first paging message further comprises a second paging configuration parameter, wherein the second paging configuration parameter is a paging range, and wherein the paging range comprises identification information of the cell corresponding to the terminal device.

26. The apparatus according to claim 25, wherein the transceiver is further configured to, before the apparatus sends the second paging configuration parameter to the first network node, receive the second configuration information from the first network node, wherein the at least one processor is configured to determine the second paging configuration parameter, and wherein the second configuration information comprises the identification information of the cell corresponding to the terminal device.

27. The apparatus according to claim 22, wherein the second paging message comprises the first configuration information.

28. The apparatus according to claim 22, wherein:
the first network node is configured to have function of radio link control (RLC) layer, function of media access control (MAC) layer, and function of PHY layer, and the apparatus is configured to have function of radio resource control (RRC) layer and function of packet data convergence protocol (PDCP) layer; or
the first network node is configured to have function of RLC layer, function of MAC layer, and function of PHY layer, and the apparatus is configured to have function of RRC layer and function of PDCP layer, wherein the first network node and the network node belong to a single base station.

* * * * *